US 8,984,535 B2

(12) United States Patent
Wiseman et al.

(10) Patent No.: US 8,984,535 B2
(45) Date of Patent: *Mar. 17, 2015

(54) SYSTEM AND METHOD FOR FACILITATING THE EXCHANGE OF INFORMATION AMONG APPLICATIONS

(75) Inventors: Lise Wiseman, Hawthorn Woods, IL (US); Nicole Tjon, Dublin, CA (US)

(73) Assignee: Accenture Global Services Limited, Dublin (IE)

( * ) Notice: Subject to any disclaimer, the term of this patent is extended or adjusted under 35 U.S.C. 154(b) by 200 days.

This patent is subject to a terminal disclaimer.

(21) Appl. No.: 13/399,837

(22) Filed: Feb. 17, 2012

(65) Prior Publication Data
US 2012/0151499 A1    Jun. 14, 2012

Related U.S. Application Data

(63) Continuation of application No. 12/465,183, filed on May 13, 2009, now Pat. No. 8,122,457, which is a continuation of application No. 09/927,957, filed on Aug. 9, 2001, now Pat. No. 7,536,697.

(60) Provisional application No. 60/299,575, filed on Jun. 19, 2001.

(51) Int. Cl.
G06F 9/44     (2006.01)
G06F 17/30    (2006.01)
G06Q 10/06    (2012.01)

(52) U.S. Cl.
CPC .......... *G06F 17/30569* (2013.01); *G06Q 10/06* (2013.01)
USPC ........................... 719/315; 719/316; 719/318

(58) Field of Classification Search
None
See application file for complete search history.

(56) References Cited

U.S. PATENT DOCUMENTS 5,420,861 A     5/1995  De La Bourdonnaye
5,701,423 A *  12/1997  Crozier .......................... 715/762
5,734,905 A *   3/1998  Oppenheim .................... 719/315

(Continued)

FOREIGN PATENT DOCUMENTS

WO         0075849         12/2000

OTHER PUBLICATIONS

BuisnessEdgeSoultions, Inc. http://www.buisnessedge.com/share/cr_velossity.asp?sectionName=businessedge, Jul. 13, 2001 (7 total pages).

(Continued)

*Primary Examiner* — Van Nguyen
(74) *Attorney, Agent, or Firm* — Fish & Richardson P.C.

(57) ABSTRACT

Facilitating the exchange of information among applications (e.g., business support systems or operational support systems or a combination thereof) may involve receiving a data object from a first application, using a first controller to route the received data object to a first transformer, using the first transformer to transform the data object from a first format used by the first application into a common format object, publishing the common format object to a communication channel, receiving a request from a subscribing application to subscribe to the communication channel, using a second controller to route the common format object to a second transformer, using the second transformer to transform the common format object into a data object in a second format used by the subscribing application, and sending the data object in the second format to the subscribing application.

21 Claims, 30 Drawing Sheets

(56) References Cited

U.S. PATENT DOCUMENTS

| | | | |
|---|---|---|---|
| 5,913,061 A | | 6/1999 | Gupta et al. |
| 5,970,490 A | | 10/1999 | Morgenstern |
| 5,991,806 A | * | 11/1999 | McHann, Jr. .................. 709/224 |
| 6,085,203 A | * | 7/2000 | Ahlers et al. .................. 715/201 |
| 6,208,345 B1 | | 3/2001 | Sheard et al. |
| 6,260,078 B1 | | 7/2001 | Fowlow |
| 6,314,533 B1 | | 11/2001 | Novik et al. |
| 6,327,594 B1 | | 12/2001 | Van Huben et al. |
| 6,338,055 B1 | | 1/2002 | Hagmann et al. |
| 6,339,782 B1 | | 1/2002 | Gerard et al. |
| 6,363,435 B1 | | 3/2002 | Fernando et al. |
| 6,370,590 B1 | * | 4/2002 | Nitz et al. ..................... 719/317 |
| 6,405,264 B1 | | 6/2002 | Jindal et al. |
| 6,405,266 B1 | | 6/2002 | Bass et al. |
| 6,408,291 B1 | | 6/2002 | Skeen et al. |
| 6,535,855 B1 | | 3/2003 | Cahill et al. |
| 6,549,956 B1 | | 4/2003 | Bass et al. |
| 6,704,785 B1 | | 3/2004 | Koo et al. |
| 6,721,779 B1 | | 4/2004 | Maffeis |
| 6,741,980 B1 | | 5/2004 | Langseth et al. |
| 6,931,392 B1 | | 8/2005 | Skeen |
| 6,959,340 B1 | | 10/2005 | Najmi |
| 7,051,071 B2 | | 5/2006 | Stewart et al. |
| 7,051,072 B2 | | 5/2006 | Stewart et al. |
| 7,143,186 B2 | | 11/2006 | Stewart et al. |
| 7,249,157 B2 | | 7/2007 | Stewart et al. |
| 7,418,475 B2 | | 8/2008 | Stewart et al. |
| 7,536,697 B2 | | 5/2009 | Wiseman et al. |
| 2006/0059107 A1 | | 3/2006 | Elmore et al. |

OTHER PUBLICATIONS

Price Waterhouse Coopers, "New World Networks," pp. 1-4, May 2001.

US Interactive, http://www.usinteractive.com, Jul. 13, 2001 (17 total pages).

Vitria, http://www.vitria.com/products/businessware/index.html, Jul. 12, 2001 (21 total pages).

Emmerich W., "An Overview of OMG/CORBA," University College London, Oct. 22, 1997, pp. 1-1; p. 1, col. 4.

Hasselbring W. "A Generative Communication Service for Database Interoperability" Cooperative Information Systems, 1998. Proceedings. 3rd IFCIS International Conference on New York, NY, USA Aug. 20-22, 1998, Los Alamitos, CA, USA, IEEE Comput. Soc., US, Aug. 20, 1998, pp. 64-73.

Spreitzer M. et al., "More Flexible Data Types," Enabling Technologies: Infrastructure for Collaborative Enterprises, 1999, (Wet Ice '99), Proceedings. IEEE 8th International Workshops on Stanford, CA, USA Jun. 16-18, 1999, Los Alamitos, CA, USA, IEEE Comput. Soc., US, Jun. 16, 1999, pp. 319-324.

Emmerich W.: "An overview of OMG/CORBA" University College London, Oct. 22, 1997, pp. 1-1, XP006506019.

Hasselbring W.: "A generative communication service for database interoperability" Cooperative Information Systems, 1998. Proceedings, 3rd IFCIS International Conference on New York, NY, USA Aug. 20-22, 1998, Los Alamitos, CA, USA, IEEE Comput. Soc., US, Aug. 20, 1998, pp. 64-73, XP010297274 ISBN: 0-8186-838-5.

Spreitzer M et al.: "More flexible data types" Enabling Technologies: Infrastructure for Collaborative Enterprises, 1999 (Wet Ice '99). Proceedings. IEEE 8th International Workshops on Stanford, CA, USA Jun. 16-18, 1999, Los Alamitos, CA, USA, IEEE Comput. Soc, US, Jun. 16, 1999, pp. 319-324, XP010358611 ISBN: 0-7695-0365-9.

U.S. Non-Final Office Action for U.S. Appl. No. 12/465,183 dated Jun. 24, 2011, 13 pages.

U.S. Notice of Allowance for U.S. Appl. No. 12/465,183 dated Oct. 18, 2011, 8 pages.

* cited by examiner

*Transformer Class:* SIToVtAddProductTransformer

*Description:* This class directs the data transformation from the Siebel Add Product system event to the Vitria Add Product business event. The Siebel Controller Class will invoke this class when the Add Product system event is received from the Siebel Servlet Source. This class will perform two main functions:
1. Invoke the S1IDLBuilder class to transform data from the Siebel Integration Object format to IDL format (Please refer to the IDL Detail Design document for IDL format.)
2. Return information in IDL format to the Siebel Controller Class to be published to a channel.

| | |
|---|---|
| *Class Variables:* | None |
| *Instance Variables:* | None |
| *Method(s):* | 1. performWork |
| | *Description:* This Method will transform the Vitria Product business component fields retrieved for the Add Product system events to IDL fields to be published by Vitria. |
| Method Details | |
| *Exception(s):* | 1. *Type:* AcknowledgementException |
| | *Description:* This contains the account id, business event, external application, success indicator, element, element id, error message, bpid and eventXML. |
| *Parameter(s):* | 1. *Name:* pEventBody |
| | *Type:* EventBody |
| | *Description:* The eventBody parameter holds the event specifications such as the name of the event, and the parameters of the event. |
| | 2. *Name:* pSti |
| | *Type:* SimpleTranslatorInterface |
| | *Description:* The SimpleTranslatorInterface contains the log level and is used this to write log messages to the appropriate log file. |
| *Event Body Parameter(s):* | 1. *Name:* SiebelMessage |
| | *Type:* SiebelMessage Event |
| | *Description:* The SiebelMessage parameter contains two sub parameters i.e., a sequence of Product Instance struct and attributes of the Siebel Message event. |
| *Return Value(s):* | 1. *Name:* eventBody |
| | *Type:* EventBody |

FIG. 2A

Controller Class: *PIController*

Description: *The Portal Controller (PIController) class will be developed to direct the business events from Vitria to the correct transformer class. Each business event has a different process that needs to be performed to create the appropriate system events. There are two functions that this class performs:*
1. *Directs events to the appropriate transformer class. Each business event will have a separate transformer class that will process the business event into the appropriate system event.*
2. *The system event (i.e. vtOpCode event) is received back from the transformer class. This class will then return the event to the connection model to be sent to the next flow (Portal Target Flow).*

| | |
|---|---|
| Class Variables: | *None* |
| Instance Variables: | *None* |
| Method(s): | *1. getTargetEventInterfaceList* |

*<b>Description:</b> This method is a public static method which will set the default input Event Interfaces for the Data Transformation flow when the PIController class is selected.*
*2. getSourceEventInterfaceList*
*<b>Description:</b> This method is a public static method which will set the default output Event Interfaces for the Data Transformation flow when the PIController class is selected.*
*3. targetTranslation*
*<b>Description:</b> This method will decide what transformer class corresponds to the input event. The transformer name and event are then passed to the callTranslation method. The targetTranslation method will be a public method.*

*FIG. 2B-1*

4. callTranslation
Description: This method will direct the event to the specified event transformer class and call the applicable transformer method. The callTranslation method is a private method within this class.
5. sourceTranslation
Description: This method overrides the sourceTranslation method in the super class. We must include this method in the PIController class because it is declared as abstract in the BaseController. However, we will not perform any actual data manipulation at this time, so we will simply return null.
6. getEventXML
Description: This method will retrieve the source event, and translate it into a xml string.

Method Details
1. getTargetEventInterfaceList

| | |
|---|---|
| Exception(s): | None |
| Parameter(s): | 1. Name: strMethodName<br>Type: String<br>Description: The name of the method which was selected by the user within the Processing Tab for a Simple Transformer, in the Vitria BW console.<br>2. Name: translateParams<br>Type: String[]<br>Description: This parameter is not used in this method, but is required by Vitria BW to implement this method.<br>7. Name: resolver<br>Type: MetaResolver<br>Description: The MetaResolver handles the switch between editable and registered versions of the event list. |
| Return Value(s): | 1. Name: eventBody<br>Type: EventBody |

*FIG. 2B-2*

2. getSourceEventInterfaceList
Exception(s): None
Parameter(s): 1. Name: strMethodName
*Type:* String
*Description:* The name of the method which was selected by the user within the Processing Tab for a Simple Transformer in the Vitria BW console.
2. Name: TranslateParams
*Type:* String[]
*Description:* This parameter is not used in this method, but is required by Vitria BW to implement this method.
3. Name: resolver
*Type:* MetaResolver
*Description:* The MetaResolver handles the switch between editable and registered versions of the event list.
Return Value(s): None 3. targetTranslation
Exception(s): None
Parameter(s): 1. Name: eventBody
*Type:* EventBody
*Description:* The eventBody parameter holds the event specifications such as the name of the event, and the parameters of the event.
2. Name: sti
*Type:* SimpleTranslatorInterface
*Description:* Use this to write log messages to the appropriate log file and retrieve the log level.
Return Value(s): Name: SystemEvent
*Type:* EventBody

*FIG. 2C-1*

4. callTranslation
*Exception(s):* None
*Parameters(s):* 1. Name: eventBody
Type: EventBody
Description: The eventBody parameter holds the event specifications such as the name of the event, and the parameters of the event.
2. Name: sti
Type: SimpleTranslatorInterface
Description: SimpleTranslator to retrieve log level and write log messages.
*Return Value(s):* Name: SystemEvent
Type: EventBody 5. sourceTranslation
*Exception(s):* None
*Parameters(s):* 1. Name: eventBody
Type: EventBody
Description: The eventBody parameter holds the event specifications such as the name of the event, and the parameters of the event.
2. Name: sti
Type: SimpleTranslatorInterface
Description: SimpleTranslator to retrieve logger instance and log level.
*Return Value(s):* None

FIG. 2C-2

6. getEventXML
*Exception(s):* None
*Parameter(s):* 1. Name: sti
Type: SimpleTranslatorInterface
Description: SimpleTranslator to retrieve logger instance and log level.
*Return Value(s):* Name: xmlEvent
Type: String

FIG. 2D

Acknowledgement Class: SIAcknowledgementTransformer

Description: This class directs and transforms the Siebel Response Message that results from the completion of a Service Status Notification or Update Product Status event to an Acknowledgement business event.

The Siebel Controller Class will invoke this class when the Siebel Response Message is received from the Siebel Target Driver. This class will perform two main functions:
1. Transform information from a Siebel Business component format to an IDL format. (Please refer to the IDL Detail Design document for IDL format.)
2. Return information in an IDL format to the Siebel Controller Class to be passed to the Acknowledgement Channel.

| | |
|---|---|
| Class Variables: | None |
| Instance Variables: | None |
| Method(s): | 1. performWork |
| | Description: This method will transform the incoming Siebel Response Message into IDL fields to be published in Vitria. |
| Method Details | |
| Exception: | 1. Type: AcknowledgementException |
| | Description: This contains the account id, business event, external application, success indicator, element, element id, bpid, and eventXML. |

*FIG. 2E-1*

| | |
|---|---|
| *Parameter(s):* | 1. Name: *pEventBody*<br>Type: *EventBody*<br>Description: *The eventBody parameter holds the event specifications such as the name of the event, and the parameters of the event.*<br>2. Name: *pSti*<br>Type: *SimpleTranslatorInterface*<br>Description: *Use this to write log message to the appropriate log file.* |
| *Incoming Siebel*<br>*ResultsEvent Body Parameters:* | 1. Name: *status*<br>Type: *String*<br>Description: *The status field is either Success or Error, indicating whether the event was processed correctly.*<br>2. Name: *error*<br>Type: *String*<br>Description: *The error field contains any error message that occurred while processing the Siebel operation.* |
| *Return Values:* | 1. Name: *eventbody*<br>Type: *EventBody[]* |

*FIG. 2E-2*

Transformer Rules for Account

| IDL | Siebel | | Portal | |
|---|---|---|---|---|
| Field Name | Integration Object Field Name | Transformation Rule (SI to IDL) | Flist Hierarchy | Transformation Rule (IDL to PI) |
| account.group.name | R2 Vitria Account | N/A | N/A | N/A String |
| account.group.description | R2 Vitria Account | N/A | N/A | N/A String |
| account.group.status | R2 Vitria Account | Transformation to common value (see IDL doc) | | String to Integer Transform to COM LOV (see IDL doc) |
| account.newStatus | R2 Vitria Account | Transform to COM LOV (see IDL doc) | 0 PIN_FLD_STATUSES ARRAY [0] 1 PIN_FLD_STATUS ENUM[0] | String to Integer, then assign to appropriate member of enum list, as per the COM LOV (see IDL doc) |
| account.accountId | R2 Vitria Account | N/A | 0 PIN_FLD_BILLINFO ARRAY [0] 1 PIN_FLD_ACCOUNT_ NO STR [0] | N/A |
| account.billInfo.payMethod | R2 Vitria Account | Transform to common value (see IDL doc) | 0 PIN_FLD_BILLINFO ARRAY [0] 1 PIN_FLD_BILL_TYPE ENUM [0] | String to Integer, then assign to appropriate member of ENUM list. Note: This field is used to determine whether or not the account is subordinate or not. |

*FIG. 3A-1*

| account.billinfo.billMedia | R2 Vitria Account | | 0 PIN_FLD_PAYINFO ARRAY [0] 1 PIN_FLD_INHERITED_INFO SUBSTRUCT [0] 2 PIN_FLD_INV_INFO ARRAY [0] 3 PIN_FLD_DELIVERY_PREFER STR [0] | Vitria must translate the paper type to enumerator |
|---|---|---|---|---|
| account.parentId | R2 Vitria Account | N/A | 0 PIN_FLD_BILLINFO ARRAY [0] 1 PIN_FLD_PARENT POID [0] | This value will be used to retrieve parent id from portal |
| account.billinfo.currency | R2 Vitria Account | Transform to COM LOV (see IDL doc) | 0 PIN_FLD_BILLINFO ARRAY [0] 1 PIN_FLD_CURRENCY INT [0] | String to Integer Transform to COM LOV (see IDL doc) |

*FIG. 3A-2*

| account.billInfo.billFrequency | R2 Vitria Account | N/A | 0 PIN_FLD_BILLINFO ARRAY [0] 1 PIN_FLD_BILL_WHEN INT [0] | Convert string to ENUM value (see IDL) |
|---|---|---|---|---|
| account.contactInfo.salutation | R2 Vitria Account | N/A | 0 PIN_FLD_NAMEINFO ARRAY [0] 1 PIN_FLD_SALUTATION STR [0] | N/A |

*FIG. 3B-1*

| | | | | |
|---|---|---|---|---|
| account.companyName | R2 Vitria Account | Limit to 56 char in GUI | 0 PIN_FLD_NAMEINFO ARRAY [0] 1 PIN_FLD_COMPANY STR [0] | N/A |
| account.contactInfo.homePhone | R2 Vitria Account | N/A | 0 PIN_FLD_NAMEINFO ARRAY [0] 1 PIN_FLD_PHONES ARRAY [0...N] 2 PIN_FLD_TYPE ENUM [0] 2 PIN_FLD_PHONE STR [0] | In addition, convert field name to type (i.e. home, work, cell) |
| account.accountType | R2 Vitria Account | 'Billing Aggregator'= Unbillable 'Billing' = Billable | 0 PIN_FLD_BILLINFO ARRAY [0] 1 PIN_FLD_BILL_TYPE ENUM [0] | Convert string to ENUM value (see IDL) |
| account.billInfo.ccardExpire Date | R2 Vitria Account | Transform to common date format | 0 PIN_FLD_PAYINFO ARRAY [0] 1 PIN_FLD_INHERTIED _INFO SUBSTRUCT [0] 2 PIN_FLD_CC_INFO ARRAY [0] 3 PIN_FLD_DEBIT_EXP STR [0] | Can only accept MM/YY |

*FIG. 3B-2*

| Sequence | System Event | Application | Description |
|---|---|---|---|
| 1 | Acknowledgement | Siebel | After processing a business event, the Siebel target connector will send an Acknowledgement for this event to Vitria to denote whether or not the operation completed successfully. |
| 2a.1 | Acknowledgement | Portal | After processing a business event, the Portal connector will send an Acknowledgement for this event to Vitria to denote whether or not the operation completed successfully. |
| 2b.1 | Acknowledgement | Arbor | After processing a business event, the Arbor connector will send an Acknowledgement for this event to Vitria to denote whether or not the operation completed successfully. |

*FIG. 5A*

| Se-quence | System Event | Appli-cation | Description |
|---|---|---|---|
| 1 | Add Product | Siebel | The "Add Product" event will send (service element) information to Vitria. This event is triggered in the CRM application when the "Submit" order button is pressed for an order. A Siebel workflow sends the necessary account information to Vitria XML format via an HTTP protocol. |
| 2a.1 | CreateOrder.Request | OMS | Vitria sends a ProvisionRequest to OMS through the OMS target connection model which then translates it into a CreateOrder.Request event. |
| 2a.2 | CreateOrder.Response | OMS | Upon provisioning, the OMS source connection model receives a CreateOrder.Response event from OMS which is then translated into a ProvisionResponse. |
| 2a.3 | ServiceStatusNotification | OMS | OMS will also send to Vitria a ServiceStatusNotification event indicating the status of the account related to the ProvisionRequest. |
| 3b.1 | Find Customer | Portal | As a result of the Add Product system events, Vitria receives an account number. Portal uses the account number and the opcode PCM_OP_CUST_FIND to determine the poid of the account that is getting new products added. |
| 3b.2 | Find Service | Portal | If CRM does not send Portal service information for this business event, Infranet assumes the deal was intended to be attached at the account level, not at the service level. If CRM sends portal service information, it will be necessary to retrieve the service poid in order to attach the product to that service. Portal uses the Service Type, Service Login, Account ID and the opcode PCM_OP _SEARCH to determine the poid of the service. *Note: If CRM fails to send service information for a defined service-level deal, Portal will send back an error to Vitria. |
| 3b.3 | Find Deal | Portal | This system event uses the deal name to call the opcode PCM_OP_CUST_POL_GET_DEALS. This will retrieve all the deals that are available. Internally, the wrapper opcode will iterate through each of the deals in order to match it to the deal's name. |

*FIG. 5B-1*

| Sequence | System Event | Application | Description |
|---|---|---|---|
| 3b.4 | Add Deal | Portal | The final opcode that may be called is PCM_OP_BILL_PURCHASE_DEAL. This opcode will take the account poid, deal poid and optionally the service poid. This information will be used to add new deals to the account/service specified. |
| 3b.5 | Acknowledgement | Portal | A response will be sent back from the Portal to Vitria indicating if the product has been successfully added or not. Vitria-IOM will transform this Acknowledgement event into an ServiceStatusNotification event to send to Siebel. |
| 4c.1a | Insert Account Component | Arbor | The insert account component event will be called when a new component is added at the account level. The component will be associated at the account level, and attached to the dummy package. |
| 4c.1b | Insert Service Component | Arbor | The insert service component will be called when a new component is added to an account at the service level. The component will be associated to the service instance. |
| 4c.2a | Activate Account Component | Arbor | Once the account component has been inserted into the database, it must be activated individually in the activate APIs before billing can begin. Each component must be activated individually. |
| 4c.2b | Activate Service Component | Arbor | Once the service component has been inserted into the database, it must be activated individually in the activate APIs before billing can begin. Each component must be activated individually. |
| 4c.3 | Acknowledgement | Arbor | A response will be sent back from Arbor to Vitria indicating that the component has been successfully entered or not. An acknowledgement event will be sent to the acknowledgement channel. |

*FIG. 5B-2*

| Se-quence | System Event | Appli-cation | Description |
|---|---|---|---|
| 1 | Add Service | Siebel | The "Add Service" event will send service instance information to Vitria. This event will be triggered in the CRM application when the "Submit" order button is pressed for an order. A Siebel workflow sends the necessary account information to Vitria XML format via an HTTP Protocol. |
| 2a.1 | Insert Service Instance | Arbor | The service instance event will create a new instance of a service instance object, and will associate the service instance id and a service location to a billing account. |
| 2a.2 | Acknowledgement | Arbor | A response will be sent back from Arbor to Vitria indicating if the service has been successfully entered or not. |
| 3b.1 | Find Customer | Portal | As a part of the Add Service system event, CRM passes the Account ID to Vitria. The wrapper opcode uses the Account ID and the opcode PCM_OP_CUST_FIND to determine the account POID. |
| 3b.2 | Create Service | Portal | The Create Service Portal system event will occur only after all of the products associated with that service have been provisioned (for I-Hub R3.0, 10 products will be provisioned by OMS, all other products provisioning status will be defaulted) and the associated account has been sent to Portal.<br>Once the account POID (account identifier) has been received by Portal, the wrapper opcode calls PCM_OP_CUST_CREATE_SERVICE to create a service instance in the infranet database. |
| 3b.3 | Acknowledgement | Portal | A response will be sent back from the Portal to Vitria indicating if the service has been successfully entered or not. |
| 4 | N/A | IOM | Vitria IOM will utilize the information within the addService event to create a ProvisioningRequest event to be sent to the Provisioning system. |

*FIG. 5C*

| Se-quence | System Event | Appli-cation | Description |
|---|---|---|---|
| 1 | Add Account Level Adjustment | Siebel | The "Apply Account Level Adjustment" event sends account adjustment information-credits and debits-from Siebel to Vitria. This event will be triggered when the Account Level Adjustment applet is committed in Siebel. The Siebel Workflow sends the account level adjustments to Vitria in XML format through HTTP protocol. |
| 2a | Find Customer | Portal | Portal uses the account number in the opcode PCM_OP_CUST_FIND to determine the account POID. |
| 2b | Apply Adjustment | Portal | The adjustment amount, account POID, and reason description are passed into PCM_OP_BILL_ACCOUNT _ADJUSTMENT to apply the adjustment to the account. |
| 2c | Acknowledgement | Portal | A response will be sent back from Portal to Vitria indicating whether the adjustment has been successfully applied or not. |
| 3a | Apply Acct Level Adj | Arbor | This event will be used to apply a credit adjustment to an account's overall charges within Arbor. The account-level adjustment will be made by creating the Adjustment API object and calling the Insert Misc function to apply the credit to the appropriate account. |
| 3b | Acknowledgement | Arbor | A response will be sent back from Arbor to Vitria indicating whether the adjustment has been successfully applied or not. |

*FIG. 5D*

| Sequence | System Event | Application | Description |
|---|---|---|---|
| 1 | Cancel Deal | Siebel | The "Cancel Product" will be triggered to send information to Vitria when a deal has been cancelled either by clicking "Cancelled" button or by changing the status field in Siebel. Siebel Workflow sends necessary product information to Vitria in XML format through HTTP protocol. |
| 2a | Find Customer | Portal | As a result of the Cancel Product system event, Vitria receives as account number. Portal uses the account number in the opcode PCM_OP_CUST_FIND to determine the account POID. |
| 2b | Read Acct Products (Replacing Find Deal) | Portal | The wrapper opcode uses the partial poid of the account object to call PCM_OP_CUST_READ_ACCT_PRODUCTS (replacing GET_DEALS) to determine the account deals and node location. |
| 2c | Cancel Product | Portal | Pass the account POID, deal POID, effective cancellation date, and (optional) service POID to PCM_OP_BILL_CANCEL_DEAL to cancel the deal at the account or service level. Default date to the correct effective date. |
| 2d | Acknowledgement | Portal | A response will be sent back from Portal to Vitria indicating whether the deal has been successfully cancelled or not. |
| 3a.1 | Cease Account Component | Arbor | This event will be used to cancel an instance of a component that is associated at the account level within Arbor. The cease function is used to cancel the unique occurrence of the Product Package Account Component API object. |
| 3a.2 | Cease Serv Inst Component | Arbor | This event will be used to cancel an instance of a component that is associated at the service instance level within Arbor. The cease function is used to cancel the unique occurrence of the Product Package Service Instance Component API object. |
| 3b | Acknowledgement | Arbor | A response will be sent back from Arbor to Vitria indicating whether the deal has been successfully cancelled or not. |
| 4 | N/A | IOM | Vitria IOM will utilize the cancelProduct information to create a provisioningRequest event to ensure the proper provisioning tasks are completed to disconnect the product. |

*FIG. 5E*

| Se-quence | System Event | Application | Description |
|---|---|---|---|
| 1 | Cancel Service | Siebel | The "Cancel Service" event will be triggered to send information to Vitria when the "Cancel" button for that service is clicked in Siebel. A Siebel Workflow sends the necessary account information to Vitria in XML format via an HTTP protocol. |
| 2a | CreateOrder.Request | OMS | Vitria sends a CreateOrder.Request (Provisioning Request) event to OMS with the expectation of a CreateOrder.Response (ProvisioningResponse) event followed by a ServiceStatusNotification event. |
| 2b | CreateOrder.Response | OMS | A CreateOrder.Response (ProvisioningResponse) will be sent back from OMS to Vitria - See step 2b above. |
| 3a | Find Customer | Portal | Portal uses the account number in the opcode PCM_OP_CUST_FIND to determine the account POID. |
| 3b | Cust Read Acct Products | Portal | PCM_OP_CUST_READ_ACCT_PRODUCTS uses the partial poid of the account object to determine the hierarchy of services. |
| 3c | Cancel Service | Portal | Pass the account POID, service POID, effective date, status, and status flags to PCM_OP_CUST_SET_STATUS to cancel the service. |
| 3d | Acknowledgement | Portal | A response will be sent back from Portal to Vitria indicating whether the service has been successfully cancelled or not. |
| 4a | Cease Service Instance | Arbor | This event will be used to cancel a service instance within Arbor by calling the cease function on the unique occurrence of the service instance object. |
| 4b | Acknowledgement | Arbor | A response will be sent back from Arbor to Vitria indicating whether the service has been successfully cancelled or not. |

*FIG. 5F*

| Sequence | System Event | Application | Description |
|---|---|---|---|
| 1 | Create Account | Siebel | The "Create Account" event will be used to send account information from Siebel to Vitria. The Create Account event is triggered in Siebel when the "Submit" order button is pressed for a new customer. A Siebel workflow sends the necessary account information to Vitria in XML format via an HTTP protocol. |
| 2a.1 | Insert Account | Arbor | This event will be used to construct the account within Arbor by creating the acct API object and using the insert function to write the account information to the appropriate Arbor database. |
| 2a.2 | Insert Product Package | Arbor | Add a product package to an existing account. |
| 2a.3 | Activate Product Package | Arbor | Activate the product for the account. |
| 2a.4 | Insert Tax Exemption Info | Arbor | Tax exemption information is set for the account by populating the Tax Exemption API object and calling the insert function to write this information to the appropriate Arbor database. There are four tax exemptions, one each for federal, state, county and city. |
| 2a.5 | Acknowledgement | Arbor | A response will be sent back from Arbor to Vitria indicating whether the account has been successfully created or not. |
| 2b.1 | Find Parent (Find Customer) | Portal | If a parent account number is passed across the Vitria interface, then the wrapper opcode will invoke PCM_OP_CUST_FIND in order to establish the poid value of the parent account. This event will also determine whether the parent is a member of a group. |
| 2b.2 | Commit Customer | Portal | Once all of the poids have been retrieved based on the information passed from the Vitria interface, the wrapper opcode calls PCM_OP_CUST_COMMIT_CUSTOMER in order to load all the new customer information into the infranet database. |
| 2b.3 | Move Member | Portal | If the account is a non-Master account, then the wrapper opcode will call PCM_OP_BILL_GROUP_MOVE_MEMBER to associate the child account to a parent account. |
| 2b.4 | Set Tax Info | Portal | When present, tax exemption information is passed with the account POID and associated with the account with the PCM_OP_CUST_SET_TAXINFO opcode. (Tax exemptions are not in scope for R3.0) |
| 2b.5 | Acknowledgement | Portal | A response will be sent back from Portal to Vitria indicating whether the account has been successfully created or not. |

*FIG. 5G*

| Se-quence | System Event | Application | Description |
|---|---|---|---|
| 1 | Modify Account | Siebel | The "Modify Account" event will be used to send changes to a customer's attributes from Siebel to Vitria. Note: Currency cannot be changed for any account. The Modify Account event is triggered in Siebel when a customer's account information is modified. A Siebel workflow sends the necessary account information to Vitria in XML format via an HTTP protocol. |
| 2a.1 | Update Account | Arbor | This event will be used to update contact, billing, address, credit card, and other account related information for an existing account in Arbor. |
| 2a.2 | Update Tax Exemption Info | Arbor | This event will be used to update tax exemption information in the appropriate Arbor database. There are four tax exemptions, one each for federal, state, county, and city. |
| 2a.3 | Acknowledgement | Arbor | A response will be sent back from Arbor to Vitria indicating whether the account has been successfully modified or not. |
| 2b.1 | Find Customer | Portal | This event pulls the Account ID from Vitria. Once this information has been received, the opcode PCM_OP_CUST_FIND is called to determine the POID of the account. |
| 2b.2 | Update Customer | Portal | Once the account POID has been retrieved this event calls the opcode PCM_OP_CUST_UPDATE_CUSTOMER in order to make any applicable updates to the customer information into the Infranet database. |
| 2b.3 | Set Tax Info | Portal | When needed, tax exemption modifications are passed with the account POID and associated with the account with the PCM_OP_CUST_SET_TAXINFO opcode. (This is out of scope for Ihub R3.0) |
| 2b.4 | Acknowledgement | Portal | A response will be sent back from Portal to Vitria indicating whether the account has been successfully modified or not. |

*FIG. 5H*

| Sequence | System Event | Application | Description |
|---|---|---|---|
| 1 | Modify Service | Siebel | The "Modify Service" event will be used to send changes to a customer's service from Siebel to Vitria. The "Modify Service" event will be automatically triggered in Siebel to send information to Vitria when any of the service information is modified. A Siebel Workflow sends the modified service information to Vitria in XML format through HTTP protocol. |
| 2a | Find Customer | Portal | Portal uses the account number in the opcode PCM_OP_CUST_FIND to determine the account POID. |
| 2b | Find Service | Portal | Portal will need to retrieve the service poid, using the service information sent from Siebel, in order to attach the product to the appropriate service. Portal uses the opcode PCM_OP_SEARCH to determine the poid of the service. The input parameters for PCM_OP_SEARCH are the Service Type, the Service Login, an inline search template built into the opcode's input flist. *Note: In the case that Siebel fails to send service information for a defined service-level deal, Portal will send back an error to Vitria. |
| 2c | Modify Service | Portal | Set the service type for the service object in the PCM_OP_CUST_MODIFY_SERVICE opcode by passing it to the service POID and the INHERITED_INFO array. The INHERIT_INFO array contains the effective date and service location information. |
| 2d | Set Password | Portal | Set the service password in PCM_OP_CUST_SET_PASSWD opcode by passing it the account POID, service POID, and password. |
| 2e | Acknowledgement | Portal | A response will be sent back from Portal to Vitria indicating whether the service has been successfully modified or not. |
| 3a | Modify Service Instance | Arbor | This event will be used to modify information related to the service instance within Arbor. |
| 3b | Acknowledgement | Arbor | A response will be sent back from Arbor to Vitria indicating whether the service has been successfully modified or not. |

*FIG. 5I*

| Se-quence | System Event | Appli-cation | Description |
|---|---|---|---|
| 1 | Service Status Notification | OMS | The OMS Source Connector will monitor the OMS database to see if there is any change in the status of a service or product. If there is a change in the status of a service or product, a Service Status Notification Event is created with the required parameters. The OMS server is accessed to obtain additional information. The Service Status Notification Event is then sent to the Vitria IOM for handoff to the automator. |
| 2 | Service Status Notification | Vitria IOM | Vitria IOM will be responsible for creating and sending the Update Product Status Business Event to Siebel (for CRM purposes). Vitria IOM logic will determine the status response to be sent upstream to Siebel. When the status is "Active", the Vitria IOM will inform Portal/Arbor to begin the billing process. |
| 3 | Update Product Status | Siebel | The Update Product Status Event will send product update information from Vitria to Siebel. Vitria will update the CRM application to "Pending" once OMS has received a work order. Vitria will also update the CRM to "Active" once the order has been successfully provisioned in OMS. Vitria will send this information to Siebel in XML format via an HTTP protocol. |

*FIG. 5J*

| Sequence | System Event | Application | Description |
|---|---|---|---|
| 1 | Update Account Status | Siebel | The Update Account Status event sends account status information from Siebel to Vitria. The Update Account Status event is triggered automatically in Siebel when a customer's account status is changed. A Siebel workflow sends the necessary account information to Vitria in XML format via an HTTP protocol. |
| 2 | N/A | IOM | The Account Process Model will receive the updateAccountStatus event and send it off to billing. It will wait for a successful acknowledgement event in return from the billing applications to be notified with the changes are complete in billing. |
| 3a | Find Customer | Portal | Portal uses the account number in the opcode PCM_OP_CUST_FIND to determine the account POID. |
| 3b | Update Account Status | Portal | Pass the account POID, status, status flag, and defaulted program name to PCM_OP_CUST_SET_STATUS to set the account status to active, suspended, or closed. |
| 3c | Acknowledgement | Portal | A response will be sent back from Portal to Vitria indicating whether the account status has been successfully changed or not. |
| 4a | Cease Account | Arbor | This event will be used to update the status of an account to a disconnect requested status by utilizing the cease function on the Account API object. |
| 4b | Reactivate Account | Arbor | This event will be used to update the status of an account to a current or active status from a closed status by utilizing the reactivate function on the Account API object. |
| 4c | Acknowledgement | Arbor | A response will be sent back from Arbor to Vitria indicating whether the account status has been successfully changed or not. |

*FIG. 5K*

| Sequence | System Event | Application | Description |
|---|---|---|---|
| 1 | Update Product Status | Siebel | Siebel will send an event to Vitria IOM that will trigger the update product event. Once Vitria receives this event it will send it on to the provisioning system. Vitria IOM will then wait until it receives a provisioning request response from the provisioning system (OMS), indicating that the event was received. It will then send a message onto Siebel letting it know that the request has been received. It will then wait for a serviceStatusNotification response from the provisioning system. Once it has received the response it will send the update product Status to Siebel to change the status to either complete or canceled. |

*FIG. 5L*

| Channel Name | Description | Business Event | Publisher | Subscriber |
|---|---|---|---|---|
| AccountChannel | Events sent to this channel will pertain to creating, modifying, and disconnecting accounts | CreateAccount<br>ModifyAccount<br>UpdateAccountStatus<br>ApplyAccountLevelAdjustment | Siebel Source Connector | Account Process Model |
| Provision Order Channel | Events sent to this channel will pertain to installing and disconnecting products and services | OrderHeader<br>AddService<br>ModifyService<br>CancelServices<br>AddProduct<br>CancelProduct | Siebel Source Connector | Order Processor Model |
| ToSiebel | All events that need to be published to the Siebel System | ServiceStatusNotification<br>UpdateProductStatus | Service Processor Model | Siebel Target Connector |
| Provisioning Request | All events that need to be published to the Provisioning systems | ProvisioningRequest | Service Processor Model | OMS Target Connector |
| Provisioning Response | All events that are published by Provisioning systems | ProvisioningResponse<br>ServiceStatusNotification | OMSSource Connector<br>OMSTarget Connector | Service Processor Model |
| Acknowledgement Channel | All Acknowledgements that an event was a success or a failure | Acknowledgement | ArborTarget Connector<br>PortalTarget Connector<br>SiebelTarget Connector | Acknowledgement ToFile<br>Service Processor Model |

*FIG. 7A*

| Channel Name | Description | Business Event | Publisher | Subscriber |
|---|---|---|---|---|
| Billing Channel | All events that need to be published to the Billing systems | CreateAccount<br>ModifyAccount<br>UpdateAccountStatus<br>ApplyAccountLevelAdjustment<br>AddService<br>ModifyService<br>CancelService<br>AddProduct<br>CancelProduct | Service Processor Model | ToArbor Channel<br>ToPortal Channel |
| ToArbor | All events that need to be published to the Arbor System | CreateAccount<br>ModifyAccount<br>UpdateAccountStatus<br>ApplyAccountLevelAdjustment<br>AddService<br>ModifyService<br>CancelService<br>AddProduct<br>CancelProduct | Billing Channel | Arbor Target Connector |
| ToPortal | All events that need to be published to the Portal System | CreateAccount<br>ModifyAccount<br>UpdateAccountStatus<br>ApplyAccountLevelAdjustment<br>AddService<br>ModifyService<br>CancelService<br>AddProduct<br>CancelProduct | Billing Channel | Portal Target Connector |

*FIG. 7B*

SYSTEM AND METHOD FOR FACILITATING THE EXCHANGE OF INFORMATION AMONG APPLICATIONS

RELATED APPLICATIONS

This application is a continuation of U.S. application Ser. No. 12/465,183, filed May 13, 2009, now U.S. Pat. No. 8,122, 457, which is a continuation of U.S. application Ser. No. 09/927,957, filed Aug. 9, 2001, now U.S. Pat. No. 7,536,697, which claims the benefit of, and incorporates by reference, U.S. Provisional Patent Application No. 60/299,575, filed Jun. 19, 2001. All of these prior applications are incorporated by reference in their entirety for all purposes.

BACKGROUND

This application relates to integrating enterprise support systems such as business support systems (BSSs) and operational support systems (OSSs). A BSS typically is a computer application with which users or other computer processes interact to support normal business functions. BSSs are used across a wide variety of industries including telecommunications, energy, pharmaceutical, government and the like. Examples of BSSs include customer relation management (CRM) applications, billing applications, financial applications, and provisioning applications. OSSs on the other hand relate to the framework of computer software and network architecture underlying the operation and execution of the BSSs. An application for monitoring and/or managing the state of a computer network is one example of an OSS.

Typically, a single enterprise (e.g., a telecommunications provider) will maintain several BSSs and OSSs (collectively, enterprise applications) that need to share information or otherwise interact. For example, a telecommunications provider may have a provisioning application for turning on/off switches to control its customers' access to telephone lines or other services, a billing application for automatically generating bills to be sent out to customers, a CRM application for maintaining a database of its customers and for dealing with service calls, complaints and the like, a financial application for handling general accounting functions, and a network management application for managing the underlying network that supports the various enterprise applications.

FIG. 1 shows a conventional method of integrating multiple enterprise applications. As shown therein, different applications communicate and/or exchange data with one another through specialized point-to-point interfaces (e.g., application program interfaces, or APIs) designed and implemented specifically for certain processes operating within the two applications being connected. Depending on the particular enterprise and the types and number of enterprise applications that it maintains, the number and complexity of point-to-point interfaces that must be designed, implemented and maintained can become significant. For example, the enterprise in FIG. 1 has eleven different applications that require at least 21 separate point-to-point interfaces between processes. In practice, the number of point-to-point interfaces required can greatly exceed the number of enterprise applications because any two applications may require multiple point-to-point interfaces between them—one for each pair of processes that need to communicate.

In general, implementing and maintaining such specialized point-to-point interfaces is time-consuming and expensive, not only because of the sheer number of point-to-point interfaces that may be required but also due to the complexity and disparity of the applications being connected. For example, different enterprise applications, especially those provided by different manufacturers, may use different programming and/or control languages, may rely on different data models, and generally present several different levels and types of incompatibilities.

SUMMARY

The present inventors recognized that building and maintaining separate point-to-point interfaces between enterprise applications is cost and time inefficient. Consequently, the present inventors developed various systems and techniques for integrating enterprise applications using an underlying framework of components and tools that dramatically reduce the time and effort required. Implementations of these systems and techniques may include various combinations of the following features.

In one aspect, facilitating the exchange of information among applications (e.g., business support systems or operational support systems or a combination thereof) may involve receiving a data object from a first application, using a first controller (e.g., a controller class defined in an object-oriented programming language) to route the received data object to a first transformer (e.g., a transformer class defined in an object-oriented programming language), using the first transformer to transform the data object from a first format used by the first application into a common format object, publishing the common format object to a communication channel, receiving a request from a subscribing application to subscribe to the communication channel, using a second controller to route the common format object to a second transformer, using the second transformer to transform the common format object into a data object in a second format used by the subscribing application, and sending the data object in the second format to the subscribing application.

The data object received from the first application may correspond to one or more of a plurality of business events. Each controller may correspond to an associated transformer. Each transformer may correspond to a unique transformation from one format to another. Transforming a data object from a format used by the first application into the common format object may involve translating the data object from a vendor-specific format associated with the first application to an Interface Data Language (IDL) object and storing the IDL object in a shared object model. The shared object model may be implemented as a central repository of data objects corresponding to business events. Transforming the data object from a format used by a first application into the common format object may be performed in response to the recognition of a business event by the first application.

In general, facilitating the exchange of information among applications may be performed in accordance with a plurality of process models that collectively define when information is to be exchanged among applications. Moreover, if requests are received from a plurality of subscribing applications, then, for each subscribing application, the common format object may be transformed (e.g., using an associated transformer) into a format corresponding to the subscribing application and sent to the subscribing application. Publishing the common format data object to a communication channel may be performed in accordance with a channel architecture that defines a plurality of communication channels having relative priorities. Transforming the common format object into a data object in the second format used by the subscribing application may involve retrieving a stored IDL format object from a central repository and translating the IDL object into a vendor-specific format associated with the subscribing application.

In another aspect, a system for facilitating the exchange of information among applications may include a plurality of process models, each defining one or more conditions for sending a business event from an application to one or more other applications, a shared object model configured to store data objects received from applications in a common format, a plurality of transformer classes configured to translate data object from a format used by one or more applications into the common format or vice versa, and a plurality of controller classes configured to route data objects to associated transformer classes.

The system further may include a channel architecture defining a plurality of communication channels, and/or relative priorities for the channels, to which data objects from an application are to be published. The system also may include an acknowledgement class configured to exchange status messages among applications and/or to perform exception handling.

In various implementations, each process model may correspond to a different business event, the shared object model may include a central repository of data objects in an Interface Description Language (IDL) format, each transformer class may correspond to a unique application format-common format translation, each controller class may be configured to route data objects to an associated transformer class according to a specific process model, and/or the transformer classes and the controller classes may be implemented as classes in an object-oriented programming language such as Java®.

One or more of the following advantages may be provided. The techniques and methods described here result in an end-to-end solution to pre-integrate CRM, billing, provisioning and other BSS and OSS systems. The integration hub is able to integrate virtually any type of application, whether pre-packaged, custom-built, legacy or other dissimilar systems. Accordingly, the integration of disparate systems can be accelerated with corresponding decreases in time, effort, cost and complexity. For example, both the initial development time and costs for integrating systems as well as the expense required for subsequent improvements and modifications can be reduced dramatically. As a result, an enterprise can easily and quickly become fully integrated to have real time visibility and control of the business and customer experience.

Moreover, the integration effort can be accelerated because the tasks are not started from scratch. Rather, a shared object model defines the data entities and the corresponding attributes. As a result, the integration effort is cost effective and the long-term costs associated with maintaining BSS and OSS systems can be reduced accordingly.

The details of one or more embodiments are set forth in the accompanying drawings and the description below. Other features, objects, and advantages will be apparent from the description and drawings, and from the claims.

DRAWING DESCRIPTIONS

FIG. 2A shows an example definition and structure of a transformer class.

FIGS. 2B-1, 2B-2, 2C-1, 2C-2, and 2D collectively show an example definition and structure of a controller class.

Figure 1:
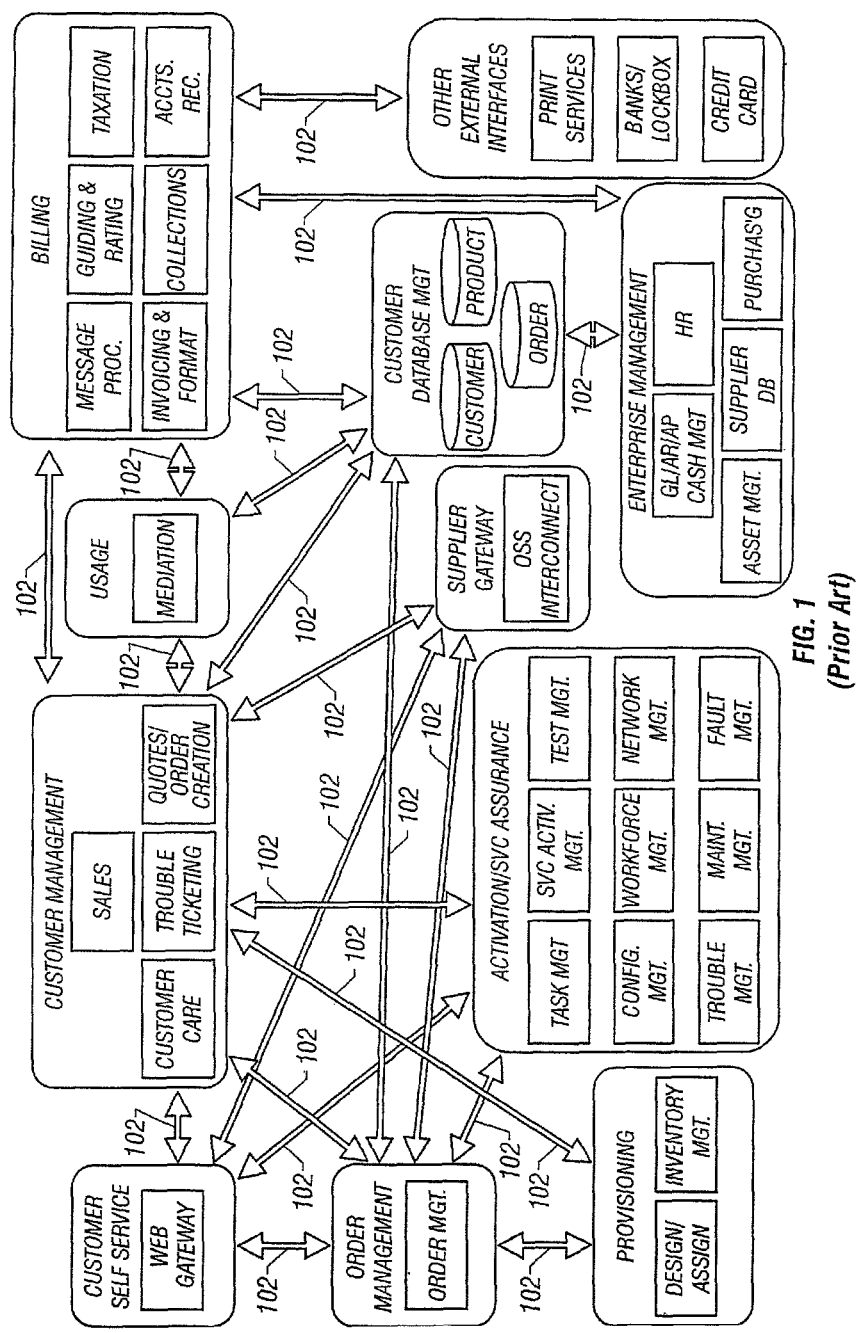
FIG. 1 is a block diagram showing point-to-point interfaces between enterprise applications.
Figure 2:
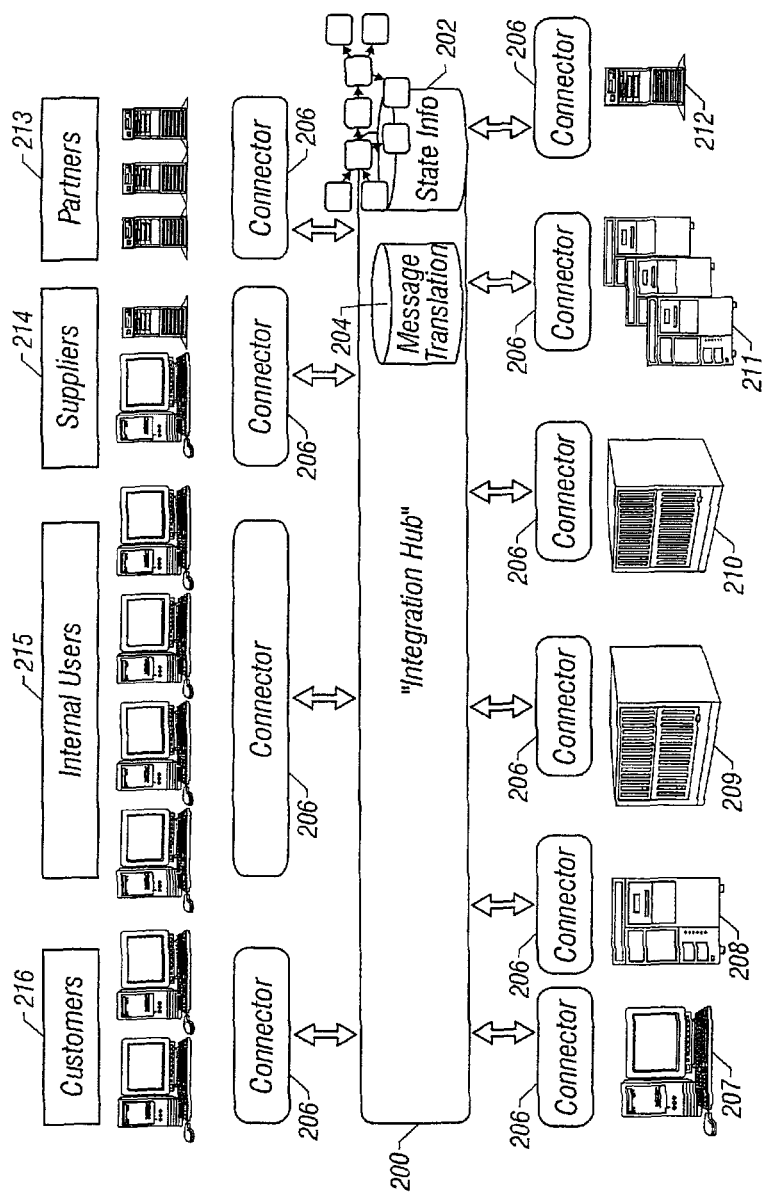
FIG. 2 is a block diagram showing an example of how the integration hub may be implemented.

FIGS. 2E-1 and 2E-2 show an example definition and structure of an acknowledgement class.

Figure 3:
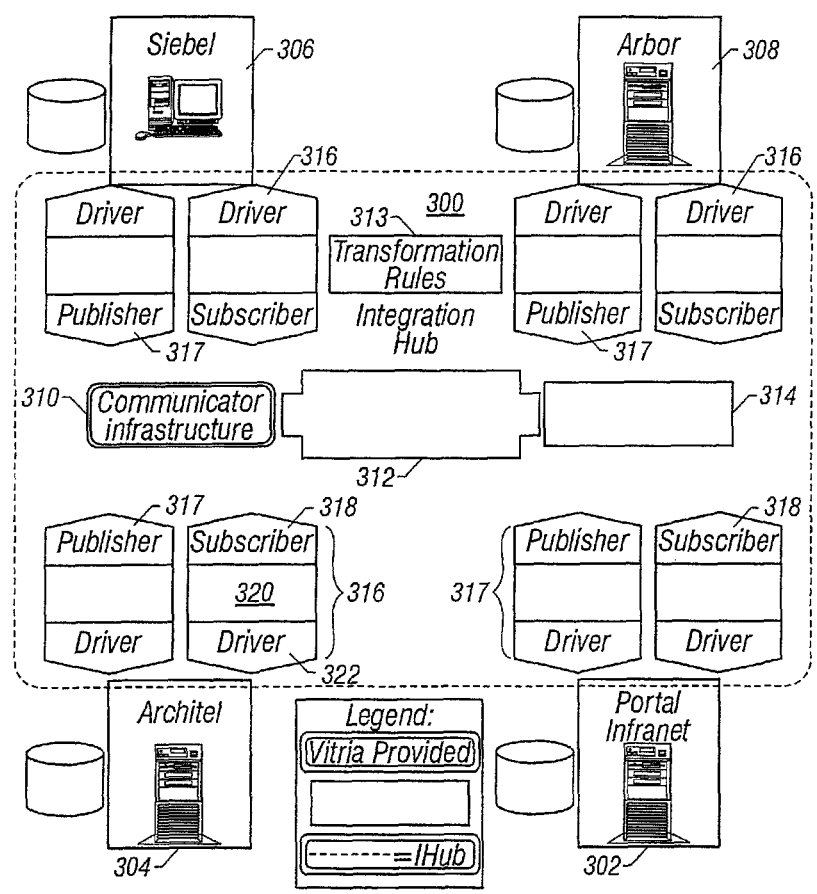

FIG. 3 is a block diagram showing additional details of an example integration hub implementation.

FIGS. 3A-1, 3A-2, 3B-1 and 3B-2 collectively show examples of transformer rules.

Figure 4:
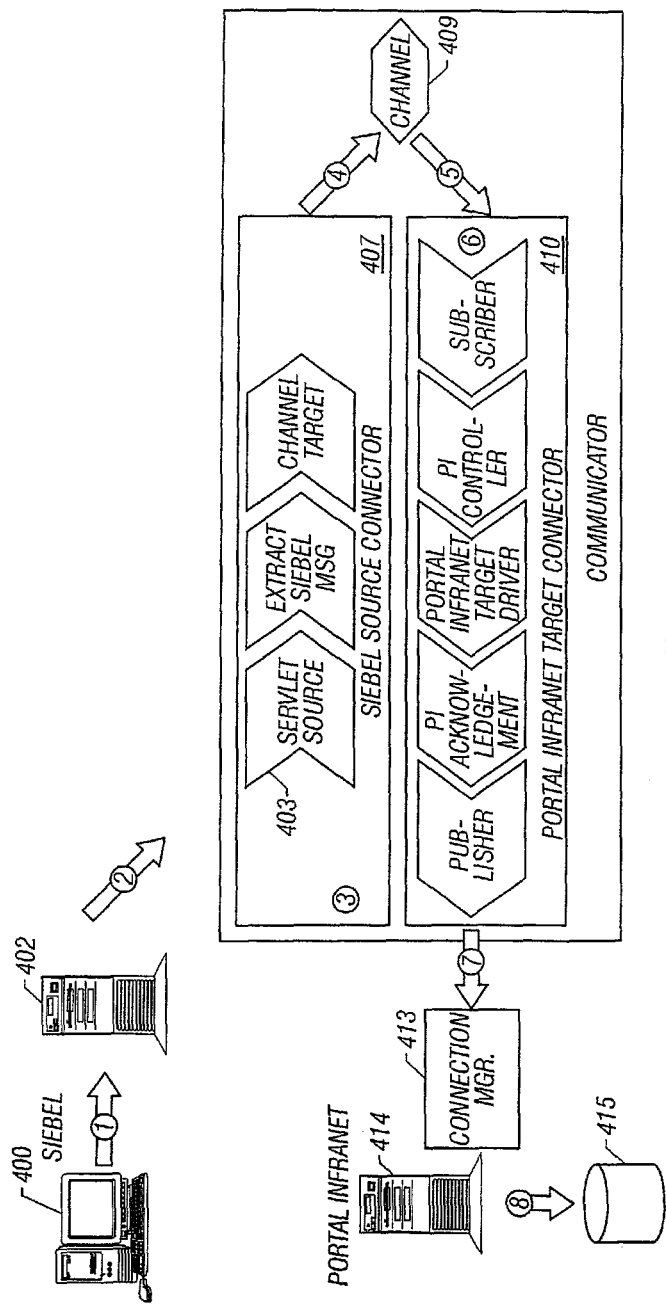

FIG. 4 is a process flow diagram showing an example of a business event being generated and published by one application and subscribed to by another application.

FIGS. 5A-5L are business event definition tables.

Figure 6:
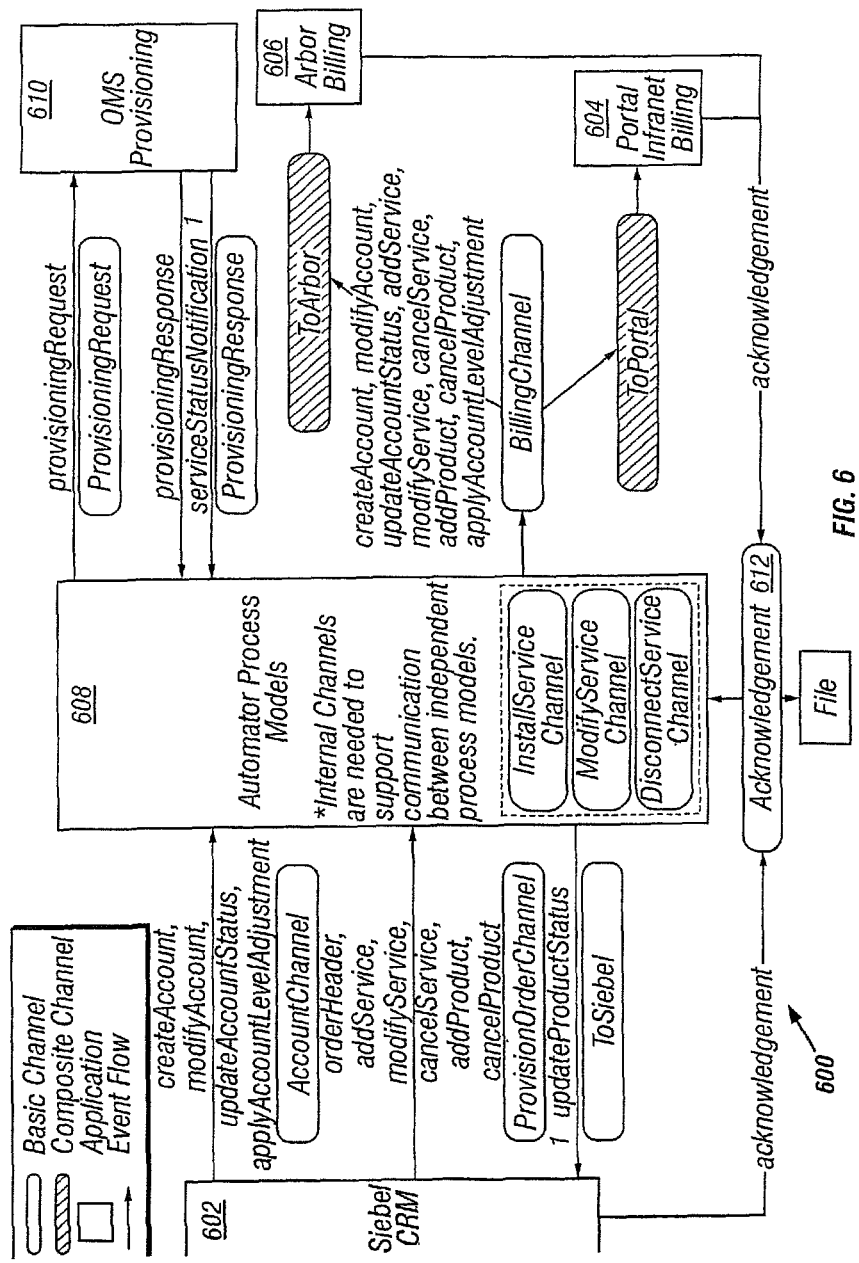

FIG. 6 is a block diagram of a channel architecture.

FIGS. 7A and 7B show a Channel Architecture Definition table.

DETAILED DESCRIPTION

The present inventors have developed a framework, referred to as the "integration hub," for integrating BSS and OSS solutions based on an enterprise's particular objectives. The integration hub is built around enterprise application integration (EAI) middleware (specifically, "BusinessWare" v3.1 available from Vitria, Inc. in Sunnyvale, Calif.) that provides an architectural framework, data requirements, and data conversion rules, which collectively facilitate the integration of "best of breed" enterprise applications such as CRM applications (e.g., Siebel eCommunications 2000, Clarify CommCenter v3.1), billing (e.g., Portal Infranet v6.1, Lucent Arbor/BP v9.1), and provisioning packaged systems (Architel OMS v1.6.2).

FIG. 2 is a diagram of an example integration hub implementation. As shown therein, the integration hub 200 uses Vitria to provide message translation 204 and facilitate the exchange of state information 202 among various enterprise applications 207-212 (e.g., order entry 207, order management 208, billing 209, provisioning 210, inventory management 211, fulfillment 212) and further facilitates communication and interaction among the enterprise applications 207-212 and various classes of end-users 213-216 (e.g., partners 213, suppliers 214, internal users 215, customers 216). The integration hub 200 communicates with each of the various entities 207-216 using a "connector"—a multi-layered software communication channel tailored to a specific enterprise application.

The integration hub is implemented as a distributed collection of software components that interact to enable enterprise applications to seamlessly and easily share information in the form of "business events." A business event represents an abstract function or activity that is common to many business systems, for example, create account, create order, cancel order, generate invoice, etc. The integration hub facilitates exchange of business events among disparate enterprise applications, for example, by translating, or transforming, business events from one proprietary format into another, via a common, shared format. There are six primary building blocks used in implementing an integration hub instance: process models, a shared object model (SOM), controller classes, transformer classes, acknowledgement class, and the channel architecture, each of which is described below.

Process Model—A process model defines a process of when to send a business event from a first enterprise application (e.g., a provisioning system) to one or more other enterprise applications (e.g., a billing system) and further defines what information is needed for each system. A separate process model is defined for each different type of business event used in the integration hub implementation. For example, depending on the specific enterprise applications involved and the particular objectives of the enterprise, a "cancel service" process model could be defined that upon detecting the creation of a "cancel service" business event in the CRM system will direct that that business event also be transformed and sent to the provisioning system (e.g., to turn off a telephone line) and to the billing system (e.g., to terminate further charges and/or generate a final invoice). A process model typically includes, at a minimum, the following components: a model server, model properties, business event definitions, business process object attribute definitions, and business process states, transitions and actions.

Shared Object Model (SOM)—The SOM is a central repository that represents enterprise data objects in common format—namely, the Interface Description Language (IDL) format. Business events received from an enterprise application in a proprietary format are transformed into the SOM format, and then when needed by another enterprise application, are transformed from the SOM format into the proprietary format of the requesting application. A SOM typically includes, at a minimum, a list of IDL structures and structure members, a list of arrays (including type and size), a list of application values and IDL values, a mapping of values to IDL fields, a mapping of IDL structures to Business Events, and a mapping of Interface Events to Business Events.

Transformer Classes (or "transformers")—The transformer classes are Java®-language classes that translate data (e.g., business events) from enterprise application format to SOM format, and/or from SOM format to enterprise application format. FIG. 2A shows an example of the definition and structure of a transformer class, "S1ToVtAddProductTransformer." A separate transformer class exists for each different transformation that may need to be performed. For example, exchanging a business event between a Siebel eCommunications CRM system and a Portal Infranet billing system would require four separate transformer classes: (1) a transformer class to translate from Siebel eCommunications format to SOM format; (2) a transformer class to translate from SOM format to Siebel eCommunications format; (3) a transformer class to translate from SOM format to Portal Infranet format; (4) a transformer class to translate from Portal Infranet format to SOM format. For example, in the embodiment of FIG. 3 (which shows an Integration Hub integration of four different enterprise applications), the following transformer classes may be used: S1ToVtAddProductTransformer, S1ToVtAddServiceTransformer, S1ToVtAppAccLv1AdjTransformer, S1ToVtCancelProductTransformer, S1ToVtCancelServiceTransformer, S1ToVtCreateAccountTransformer, S1ToVtModifyAccountTransformer, S1ToVtModifyServiceTransformer, S1ToVtOrderHeaderTransformer, S1ToVtUpdAccStatusTransformer, SLTransformer, VtToS1UpdPrdctStatusTransformer, VtToS1UpdSrvcStatusTransformer, P1Transformer, VtToP1AcctAdjustmentTransformer, VtToP1AddProductTransformer, VtToP1AddServiceTransformer, VtToP1CancelProductTransformer, VtToP1CancelServiceTransformer, VtToP1CreateAccountTransformer, VtToP1ModifyAccountTransformer, VtToP1ModifyServiceTransformer, VtToP1UpdateAcctStatusTransformer, ABPTransformer, VtToABPAddProductTransformer, VtToABPAddServiceTransformer, VtToABPApplyAcctLvlAdjmntTransformer, VtToABPCancelProductTransformer, VtToABPCancelServiceTransformer, VtToABPCreateAccountTransformer, VtToABPModifyAccountTransformer, VtToABPModifyServiceTransformer, VtToABPUpdateAccountStTransformer, OMSTransformer, OMSToVtProvisioningResponseTransformer, OMSToVtServiceStatusNotification, and VtToOMSRequestBroadbandTransformer.

Controller Classes (or "controllers")—The controller classes are Java®-language classes that route business events to appropriate transformer classes. For example, if the process model specified that a business event generated at the Siebel eCommunications CRM system needs to be sent to the Portal Infranet billing system, one controller class would route the Siebel eCommunicationsformatted business event to the transformer that translates from Siebel eCommunications format to SOM format, and another controller class would route the SOM-formatted business event to the transformer that translates from SOM format to Portal Infranet format. FIGS. 2B, 2C and 2D collectively show an example of the definition and structure of a controller class, "P1Controller." In the embodiment of FIG. 3, for example, the following controller classes may be used: S1Controller, P1Controller, ABPController, and OMSController.

Acknowledgement Class—The acknowledgement class is a Java®-language class that is used to send status messages from an enterprise application to one or more other enterprise applications and/or for exception handling. For example, each time a business event is received by an enterprise application, the receiving application invokes an acknowledgement class to signal either that the transfer was successful or that a particular error occurred. Upon occurrence of error, the acknowledgement class can trigger an appropriate error-handling procedure. FIG. 2E shows an example of the definition and structure of an acknowledgement class, "S1AcknowledgementTransformer."

Channel Architecture—The channel architecture defines the communication channels to which business events will be published and the relative priority of those channels. For example, the following channels are used in the integration hub implemenation depicted in FIG. 3: AccountChannel, ProvisionOrderChannel, ToSiebel, Acknowledgement Channel, ProvisioningRequest, ProvisioningResponse, BillingChannel, ToArbor, and ToPortal. Each of the integration hub business events is assigned a specific channel. Further details on the Channel Architecture are provided below.

FIG. 3 shows details of an example integration hub implementation. In this example, four different enterprise applications are integrated using the integration hub 300: a Portal Infranet billing application 302, an Architel provisioning application 304, and a Siebel eCommunications CRM application 306 and an Arbor billing application 308. The integration hub 300 is comprised of a shared object model (SOM) 312, a communicator infrastructure 310, a channel architecture 314 and connectors 316, 317. The SOM 312 provides a predefined common logical model of business objects and events specific to a particular industry.

The SOM 312 is an IDL representation (defined using the Vitria software developers' kit (SDK)) of common business entities in Vitria BusinessWare. These business entities include account, customer, contact, order, payment, and billing information. The integration hub IDL defines the data format, modules, and structures of common business entities such as account, product, service, order, customer, payment, and contact. Enterprise applications generate functions that are translated into business events within Vitria. Vitria encapsulates the business data for these events, e.g. Create Customer, Add Product, Cancel Service, in an IDL format that the integration hub defines as the shared object model (SOM).

The SOM 312 is used by the transformation classes, which as described above are a set of Java®-language classes that use transformation rules 313 to translate data from enterprise application format to SOM format or vice versa. In effect, the transformation rules 313 are business rules that translate from the specific APIs (application program interfaces) used by the enterprise applications into the common SOM format and vice versa. More particularly, the event transformation rules 313 are defined in the transformer classes. These Java® transformer classes load enterprise application data into Vitria business event objects. The transformers also extract data from business event objects and load them into enterprise application databases or APIs. The transformer classes operate by applying formatting and translation logic to the data before loading them into an application or business event. These translation rules include changing numeric fields to alpha numeric, changing status values to enumerator or Boolean values, and copying string or numeric fields to target string or numeric fields. The transformers include exception handling and acknowledgement classes that capture errors and publish them to an acknowledgement channel or error log.

The communicator infrastructure 310 provides transactional synchronous and/or asynchronous message structure for communicating between the integration hub 300 and the enterprise applications. It reliably transports information in a consistent format between systems by employing an event-driven publish-subscribe methodology via communications channels. The communicator 310 includes a number of channels to which an application can publish an event and to which another application can subscribe to receive the event. The communicator infrastructure used in this embodiment was developed by, and is available from, Vitria, Inc. of Sunnyvale, Calif.

The channel architecture 314 defines how messaging will be partitioned for high-performance communications. The channel architecture defines the communication channels that business events will be published to. These channels include New Order, Account, and Product. Each of the integration hub business events is assigned a specific channel. The integration hub channels are prioritized (using the priority scheme developed by Vitria) to ensure that business events are sent to enterprise applications in the correct order; e.g. Create Customer is sent to billing before Add Product. Detailed documentation on the priority scheme is available directly from Vitria for customers and integration partners.

The connectors 316, 317 are part of the communicator 310 and represent the channels for communicating between the integration hub 300 and the enterprise applications. The communicator has two different types of connectors to communicate with each separate application: a publisher connector 317, which publishes a business event from a publishing application to a channel in the communicator 310, and a subscribing connector 316 which receives a business event from the communicator 310 (pushed by a publisher connector 317) into the subscribing application connector.

Each business event represents a logical business function. Sample business events include account creation, product creation, service modification, and product cancellation. The Create Customer business event, for example, originates in the CRM application, e.g. Siebel or Clarify. The CRM application invokes an API or changes database tables that the integration hub monitors. The integration hub uses its connector architecture, which includes controllers and transformers, to translate the enterprise data into a SOM format within a business event. The integration hub publishes the business event onto the appropriate channel. Subscribers of the event—e.g., billing, provisioning, process automation—subscribe to the business event from the channel and into their respective connectors. The connectors translate the SOM data into the target enterprise application's data format; e.g. Portal Infranet, Architel OMS. The connector invokes an application-specific API to load the data into the target enterprise application. The target enterprise application generates an Acknowledgement business event in the integration hub that includes the success/failure status and result data of the target enterprise application's API. This Acknowledgement business event is published to the Acknowledgement channel for transmission to another enterprise application or a log file.

Each Vitria connector 316, 317 is comprised of three different components: a publisher/subscriber module 318 (depending on whether the connector is a publisher connector 317 or a subscriber connector 316), a transformer 320 and a driver 322. The Vitria publisher/subscriber modules 318 send/retrieve business events to/from the communicator infrastructure 310. The Vitria drivers 322 provide pre-built interfaces to packaged applications. As with the communicator infrastructure 310, the Vitria drivers 322 and the Vitria subscriber/publisher modules 318 used in this embodiment were developed by and available from Vitria, Inc., although in other embodiments they could be custom-developed if desired. Further details on the publisher/subscriber module 318 and the driver 322 are provided in documentation available from Vitria.

The transformer component 320 of each connector 316, 317 provides the execution environment for the event transformation rules 313. More particularly, each transformer 320 is a separate Java®-language class that, when invoked, performs a translation function on data (e.g., a business event) using methods defined by the transformation rules. A transformer rule is an algorithm that converts between the message formats to disparate applications. A transformation rule lists the fields of the related messages of the applications and describes how each field is related to another. FIGS. 3A and 3B collectively show an example of the transformation rules used for the CRM, Billing, and middleware applications.

In general, the integration hub provides a framework that enables a first application, upon having a business event created or otherwise occur locally (such as the creation of a new customer account by a human user), to publish the event to an appropriate channel in the communicator infrastructure, and concurrently have the event converted to a common format (i.e., the SOM format). At that point, any other enterprise application connected to the integration hub can subscribe to the channel of interest and retrieve the newly created event. As part of the retrieval process, the event is converted from the common SOM format into the APIs and fields used by the subscribing application. The subscribing application then can use the APIs and fields to undertake its own local action responsive to, or otherwise appropriate for, the business event generated by the first application.

FIG. 4 shows an example of data flow during a typical sequence using the integration hub architecture to exchange business events between two applications—in this example, a Siebel eCommunications CRM application and a Portal Infranet billing application. Assume, for example, that a human operator creates a new customer account and a service order for that account in the Siebel eCommunications CRM application running on node 400. Following the submission of the service order, the CRM Application causes the new account information to be sent in Step 1 to the server 402 which hosts the application's database engine. The Siebel Workflow Manager (a component of the Siebel application) is what performs this send. It is invoked to send customer information to the Integration Hub. Upon submission of the service order, the Siebel Workflow Manager determines that a new account has been created and needs to be sent to the Integration Hub. The Siebel Workflow Manager then goes to the Siebel database and retrieves an instance of a pre-defined Siebel integration object called "Vitria Account". The integration object tells the workflow manager what data to get and where to get it from, for that particular business event. Within Siebel eCommunications, the customer data, which comprises the integration object instance, is transformed into XML (extensible markup language) format and sent over an HTTP (hypertext transfer protocol) protocol to Vitria servlet 403. The Siebel source connector model 407 is a publisher to the Vitria servlet.

Next, in Step 3, the Siebel source connector model 407 converts the XML data into an IDL format and then a transformer translates the Siebel IDL format into a shared object model format. The source connector 407 in Step 4 creates a "Create Customer" event (in the SOM format) and publishes it onto the channel 409, which receives Create Customer business events that billing applications subscribe to. The integration hub channels are prioritized using Vitria's configuration tools to ensure business events are received in the correct order; e.g. a Create Customer business event is processed before a Add Product business event.

Next, in Step 5, the Portal Infranet target connector 410 executing on node 414 subscribes to the channel 409. Next, in Step 6, a transformer transforms the "Create Customer" event from the SOM format into appropriate APIs and field lists for the Portal Infranet application. In Step 7, a Vitria target driver sends the APIs and field lists to the connection manager component 413 of the Portal Infranet application. Finally, in Step 8, Portal Infranet creates a new customer account within its local Account table in its database 415.

The integration hub's shared object model has defined, and uses, a set of core business events to pass customer, product and service data among the various enterprises applications. The number and types of business events used for a given integration depend on the applications being integrated and the objectives of the enterprise and its users. Often, the business event definitions are industry-specific, for example, specific to the telecommunications industry, because companies in a given industry often use the same or similar enterprise applications in furthering their commercial endeavors.

For the example of FIG. 5, in which a CRM system and a billing system are integrated to share information with each other, the following ten core business events were defined and used:

Create Order—starts the provisioning and billing process of an order within the process models
Add Product—add a new product to an account or service from CRM into provisioning and billing
Add Service Instance—add a new service instance, service location, login, and password to an account from CRM into provisioning and billing
Apply Account Level Adjustment—apply account-level adjustments (credits and debits) from CRM into billing
Cancel Product—cancel an existing product from an account or service from CRM into provisioning and billing
Cancel Service Instance—cancel an existing service instance from an account from CRM into provisioning and billing
Create Customer—submission of billing, payment, and contact information for a new account from CRM into billing
Maintain Account—submission of changed billing, payment, and contact info for an existing account from CRM into billing
Maintain Service Instance—make corrections to an existing service's location and password from CRM into provisioning and billing
Update Account Status—transfer changes to account status (active, suspend, closed) from CRM to billing
Update Product Status—as provisioning system (OMS) passes through its processes, the product status will be updated automatically in Siebel the billing system to the CRM system In effect, these 10 business events define a common language for communicating between the Siebel eCommunications 2000 CRM, Portal Infranet v6.1 billing, Lucent Arbor/BP v9.1 billing, and Architel OMS provisioning. The integration hub effectively acts as the intermediary and interpreter to facilitate communication between these systems. Integrating additional applications into the enterprise would generally require the definition and use of different or additional business events specific to the applications under consideration. However, by defining business events that have general applicability to several different types of applications (e.g., Create Customer), business events can be re-used thus reducing the integration effort, expense and complexity. In general, other embodiments could use additional or different business events, depending on the applications being integrated as well as the objectives of the enterprise and its users.

FIGS. 5A-5L are examples of business event definition tables. These particular business events were defined for integrating a Siebel CRM system with two different billing systems: Portal Infranet and Arbor. The set of 12 business events defined below and in FIGS. 5A-5L are sufficient to enable the Siebel CRM system, the Portal Infranet billing system and the Arbor billing system to exchange information that implements the integration objectives of the enterprise. The integration hub defines process models within Vitria that subscribe to the Create Customer, Modify Customer, Update Account Status, Add Product, Add Service, Modify Service, Cancel Service, and Cancel Product business events. The order management process models created in the integration hub define the process management of accounts, orders and services. These process models define the process of when to send business events to the provisioning and billing systems and define what information is needed for each system. As an example, the Add Service Instance and Add Product business events for ordering a telecom service (e.g., a digital subscriber line (DSL)) must first be sent to Architel OMS for provisioning and then to Infranet or Arbor for billing after it has been provisioned. The Add Product for a DSL modem can be sent directly to Infranet or Arbor for billing. For both examples, the process model is a subscriber and publisher of the Add Product business event. The process model subscribes to the Add Product business event after it is published by the CRM, e.g. Siebel, Clarify. As discussed below, the process model, in turn, publishes the Add Product business event to the ProvisioningRequest channel in FIG. 6 and/or the Billing channel in FIG. 6 based on the product type.

FIG. 5A shows the definition table for the "Acknowledgement" business event, further details of which are set forth below.

File Name: Acknowledgment Event
Type: Business Event Definition
Publisher(s): Billing (Arbor, Portal)
    CRM (Siebel)
Subscriber(s): Install Service Process Model
    Modify Service Process Model
    Disconnect Service Process Model
    AcknowledgementToFile
IDL File Name: ihBusinessEvents.idl
Business Event Name: Acknowledgment
Description: An acknowledgement event can be created in two main ways:
1. If the translation or the transformation fails in the Arbor, Portal and Siebel connectors an error message is written to the acknowledgement log file.
2. As Arbor, Portal and Siebel target connectors' process each Business Event, an acknowledgement event will be created from the response returned from the application. This acknowledgement will act as a confirmation to the Vitria process models that Arbor, Portal or Siebel has successfully processed each business event.

FIG. 5B shows the definition table for the "Add Product" business event, further details of which are set forth below.

File Name: Add Product Event
Type: Business Event Definition
Publisher(s): CRM (Siebel)
    Install Service Process Model
    Modify Service Process Model
    Disconnect Service Process Model
Subscriber(s): Billing (Portal, Arbor)
    Order Pre-Processor Model
IDL File Name: ihBusinessEvents
Business Event Name: Add Product
Description: When a new service order containing products that are purchased by a customer, an Add Product event is kicked off. This event passes the deal (i.e. component or bundle) name stored in the CRM as well as the name of the account that it should be added to. This information is sent to the provisioning system if the product requires provisioning. Once provisioning has been completed, the add product event will be sent to the billing system and the product is added to the appropriate account.

FIG. 5C shows the definition table for the "Add Service" business event, further details of which are set forth below.

File Name: Add Service Event
Type: Business Event Definition
Publisher(s): CRM (Siebel)
    Install Service Process Model
    Modify Service Process Model
    Disconnect Service Process Model
Subscriber(s): Billing (Arbor, Portal)
    Order Pre-Processor Model
IDL File Name: ihBusinessEvents
Business Event Name: Add Service
Description: The Add Service event occurs when a new service is ordered. When a new service is ordered, the CRM application passes the details to the billing application i.e. account number, service type, service instance id, password, effective date, and service location via Vitria IOM. Vitria IOM will utilize the service information to create a provisioningRequest event to provision the products associated with the given addService event. Once a product underneath the specific serviceInstance is complete, IOM will then send the addService event to the billing application and create a service instance under the appropriate billing account.

FIG. 5D shows the definition table for the "Apply Account Level Adjustment" business event, further details of which are set forth below.

File Name: Apply Account Level Adjustment
Type: Business Event Definition
Publisher(s): CRM (Siebel), Account Process Model
Subscriber(s): Billing (Portal, Arbor)
    Account Process Model
IDL File Name: ihBusinessEvents
Business Event Name: Apply Account Level Adjustment
Description: When an adjustment is applied to an account, the adjustment information will be sent from CRM to Billing. Account number, adjustment amount, and reason description will be passed from CRM to Vitria into Billing.

FIG. 5E shows the definition table for the "Cancel Product" business event, further details of which are set forth below.

File Name: Cancel Product (Version 1.0)
Type: Business Event Definition
Publisher(s): CRM (Siebel)
Subscriber(s): Billing (Portal, Arbor)
IDL File Name: ihBusinessEvents
Business Event Name: Cancel Product
Description: This event removes product from an account or service object. This event passes the information such as, deal or component name, product instance id, account number, and optionally, service type, service id (Portal login), and service password from the CRM to Billing through the Vitria connectors and Vitria IOM component. This information is sent to the billing system and a confirmation of delivery is then sent to an acknowledgement log file.

FIG. 5F shows the definition table for the "Cancel Service" business event, further details of which are set forth below.

File Name: Cancel Service (Version 1.0)
Type: Business Event Definition
Publisher(s): CRM (Siebel)
Subscriber(s): Billing (Portal, Arbor), Provisioning
IDL File Name: ihBusinessEvents
Business Event Name: Cancel Service
Description: The Cancel Service event cancels a service by changing its status from active to closed. The CRM sends the Cancel Service event (Including account number, service type, service ID, effective date, and status) to the Vitria connector after the service has been cancelled in the CRM.

Upon receipt of the Cancel Service event, Vitria IOM sends a Provisioning Request event (CreateOrder.Request—OMS System Event) to Provisioning and awaits a Provisioning Response event (CreateOrder.Response—OMS System Event). Once provisioning is complete, Vitria IOM sends a Cancel Service event to billing.

Billing receives the account number through the Vitria connector and it uses the account number to find the account. The service POID is found in Portal and the service status is changed by invoking the ChangeStatus opcode. Within Arbor, the service instance id is used to call the cease function on the specific instance of the Service Instance object that needs to be cancelled. Only the service instance id (external_id) and effective date will need to be passed in order to cancel service within Arbor.

FIG. 5G shows the definition table for the "Create Customer" business event, further details of which are set forth below.

File Name: Create Customer Event Definition
Type: Business Event Definition
Publisher(s): CRM (Siebel)
   Install Service Process Model
   Modify Service Process Model
   Disconnect Service Process Model
Subscriber(s): Billing (Portal, Arbor)
   Account Process Model
IDL File Name: ihBusinessEvents
Business Event Name: Create Customer
Description: The Create Customer event occurs when an order for a new customer is submitted. When the first order for a new customer is submitted, the CRM application passes the createAccount event into Vitria and to the Account Process Model. The Account Process Model will then send the createAccount event containing contact, payment, and billing information into the Billing Application. The Billing Application takes this information and creates an account. All optional fields that were not passed from CRM application will have default values in the Billing application. The Billing application will send to Vitria a confirmation indicator message stating whether the Billing application has successfully created the customer or not.

FIG. 5H shows the definition table for the "Modify Account" business event, further details of which are set forth below.

File Name: Modify Account
Type: Business Event Definition
Publisher(s): CRM (Siebel)
   Install Service Process Model
   Modify Service Process Model
   Disconnect Service Process Model
Subscriber(s): Billing (Portal, Arbor)
   Account Process Model
IDL File Name: ihBusinessEvents
Business Event Name: Modify Account
Description: The Modify Account event occurs when a customer's attributes change. Account modifications include changes to an account's billing address, contact information, bill payment method, and bill cycle date. When an account's attributes change, the CRM tool passes the billing system information regarding changes to the customer account. The billing system takes the information and updates the customer's attributes. The billing application will send Vitria an acknowledgement message when the billing system has successfully updated the customer's information. Examples of account attribute changes are changes to: the account's name, the account's address, the account's contact information, the billing cycle, the billing currency, the bill payment type, and the account close day of month. Note that the currency cannot be changed for any account. The bill frequency, bill type, and bill cycle day can only be modified for non-subordinate accounts.

FIG. 5I shows the definition table for the "Modify Service" business event, further details of which are set forth below.

File Name: Modify Service
Type: Business Event Definition
Publisher(s): CRM (Siebel)
   Install Service Process Model
   Modify Service Process Model
   Disconnect Service Process Model
Subscriber(s): Billing (Portal, Arbor)
   Order Pre-Processor Model
IDL File Name: ihBusinessEvents
Business Event Name: Modify Service
Description: The Modify Service event will take place in the CRM when any service information is modified. The information regarding the change will be sent to the Billing Application.
There are three alternate scenarios that result in a modify-Service event.
   1. A new product is added to an existing Service.
   2. A product is cancelled from an existing Service, however there are still other active products remaining under the same service.
   3. A product is added and a product is cancelled under an existing service.

FIG. 5J shows the definition table for the "Service Status Notification Error" business event, further details of which are set forth below.

File Name: Service Status Notification
Type: Business Event Definition
Publisher(s): Provisioning (OMS)
   Product Service Model
Subscriber(s): Install Service Process Model
   Modify Service Process Model
   Disconnect Service Process Model
IDL File Name: ihBusinessEvents
Business Event Name: Service Status Notification
Description: The purpose of this event is to send provisioning status information from OMS to the Vitria IOM. When a new service or product request is made (Provisioning Request Event), it is sent to OMS via the OMS Target Connector. A response (Provisioning Response Event) is sent by OMS to Vitria IOM via the OMS Target Connector. The OMS Source Connector will monitor the OMS database to see if there is any change in the status of a service or product. If there is a change in the status of a service or product, a Service Status Notification Event is created with the required parameters. The OMS server is accessed to obtain additional information. The Service Status Notification Event is then sent to Vitria IOM. The Vitria IOM will create and send the Update Product Status Business Event to Siebel (where the CRM information will be updated). Once provisioning is complete, the automator will then trigger the billing events to Portal/Arbor (where the BILLING information will be updated).

FIG. 5K shows the definition table for the "Update Account Status" business event, further details of which are set forth below.

File Name: Update Account Status
Type: Business Event Definition
Publisher(s): CRM (Siebel)
   Install Service Process Model
   Modify Service Process Model
   Disconnect Service Process Model
Subscriber(s): Billing (Portal, Arbor)
   Account Process Model
IDL File Name: ihBusinessEvents
Business Event Name: Update Account Status
Description: The purpose of this event is to send information from the CRM to the Billing application when an account is suspended, re-activated or closed. The CRM sends the account ID and status to Billing through the Vitria connectors and the Account Process Model. When an account status is changed to "Suspended", "Active" or "Closed", the child account's status must be changed to correspond to the same status. The CRM application will change the child services or products to the "Suspended", "Active", or "Closed" status before the account status is changed. This is a user training issues, and must be incorporated in the training plan.

FIG. 5L shows the definition table for the "Update Product Status" business event, further details of which are set forth below.

File Name: Update Product Status
Type: Business Event Definition
Publisher(s): Provisioning (Architel), Vitria IOM
Subscriber(s): Vitria IOM, CRM (Siebel)
IDL File Name: ihBusinessEvents
Business Event Name: Update Product Status
Description: When a product event is triggered it will be sent from Siebel to the Service Level Model. The Service Level Model will then send a provisioning request to the provisioning system (OMS). When the provisioning system receives the request a response will be sent back to the Service Level Model indicating that the request has been received. Siebel will then be notified in order to update the product status. Upon the completion of provisioning all the products OMS will send a Service Status Notification back to the Service Level Model. This will then be passed onto Siebel and the status of the product will be changed to complete or cancelled depending on the event that triggers this process.

FIG. 6 is a block diagram of the integration hub's channel architecture 600. To aid in understanding the data flow involved in FIG. 6, an explanation for each component in this figure is provided. The Siebel application 602 is the CRM application where customer data originates. There are specific data fields required by the downstream billing systems, Portal Infranet 604 and Arbor 606. A "channel" is a key organizational concept in the publish/subscribe model in that it accepts incoming events from publishing applications and communicates these events to subscribers of that channel. FIG. 7 is a Channel Architecture Definition table that includes a description of each channel and the associated publisher/subscriber information.

The Automator Process Model 608 is a Vitria graphical model that specifies application integration logic. Specifically, the automator 608 is the business automation component that controls the flow of data between systems, and ensures the timely delivery of accurate data. The OMS application 610 is used for provisioning purposes. The Acknowledgement channel 612 handles the exception logic by recording processing errors and success messages in a text file (Acknowledgement.txt). The error information may include the name of the failed event, the name of the application for which the connector belongs, the error message, and a flag to denote a success or failure. This information is packaged within an event that is sent to the Acknowledgement channel 612. Business Events, as described above, are represented in FIG. 6 at the point of each event flow.

The following example represents an example of data flow that may take place in the architecture 600 when a new customer orders a DSL product. The Required information will be entered into the Siebel system 602 and once the 'Submit' button is pushed by an operator, all four events are sent to Vitria: one createAccount event, one orderHeader event, one DSL addService event, and one DSL addProduct event. The events will be processed by the Order Processor Model and finally the Service Process Model. These models handle the interaction between the OMS provisioning system 610 and billing systems 604, 606. A provisioningRequest event is generated from this order as well. The provisioningRequest event is then sent to the OMS provisioning system 610.

Upon receiving the request, the provisioning system 610 will send back a provisioningResponses for confirmation. As a result of the response event, Vitria will send an updateProductStatus event to the Siebel CRM 602 in order to set the status of the product to 'Pending.'

Once provisioning is complete, the OMS provisioning system 610 will send two serviceStatusNotification events to Vitria denoting the DSL service and it's product is now 'Active.' Vitria will then send a serviceStatusNotification event to the Siebel CRM 602 denoting that the DSL service is active. Vitria will also send an updateProductStatus event to the Siebel CRM 602 to change the status of the DSL product to 'Active.' At the same time, the addservice event and addproduct event will be sent to one or more of the billing systems 604, 606. The orderHeader event is internal to Vitria and will not be sent to billing.

The channel architecture 600 described above is a configuration of Vitria's native channel architecture. The integration hub has defined an account, product, new order, and billing channels to which business events are published. The account, product, and new order channels are routed to the composite billing channel. The account, product, and new order channels are prioritized to ensure that business events are sent to billing and provisioning in the correct order.

Various implementations of the systems and techniques described here may be realized in digital electronic circuitry, integrated circuitry, specially designed ASICs (application specific integrated circuits), in computer hardware, firmware, software, or combinations thereof, or in other types of machines.

A number of embodiments of the present invention have been described. Nevertheless, it will be understood that various modifications may be made without departing from the spirit and scope of the invention. Accordingly, other embodiments are within the scope of the following claims.

What is claimed is:
1. A computer-implemented method of exchanging information among applications, the method comprising:
receiving, from a first application, a first data object that represents an event and that is structured in a first proprietary format used by the first application;
accessing, from electronic storage, a translation rule that is associated with the first application and that defines at least one rule for translating data objects from the first proprietary format into a common format used by an integration hub;
translating the first data object that represents the event into a common format data object that represents the event based on the accessed translation rule that is associated with the first application;
identifying the event represented by the common format data object;
based on the identified event represented by the common format data object, selecting, from among multiple channels defined in the integration hub, a specific channel that is assigned to communicate, in the integration hub, common format data objects that represent the identified event;
publishing the common format data object to the selected channel that is defined in the integration hub and that is assigned to communicate, in the integration hub, common format data objects that represent the identified event;

receiving, on the selected channel, the common format data object by a second application; and publishing an acknowledgement event to an acknowledgement channel that is defined in the integration hub and that is assigned to communicate, in the integration hub, common format data objects that represent acknowledgement events, the acknowledgement channel being different than the selected channel and the acknowledgement event indicating success or failure of communication of information included in the common format data object to the second application.

2. The method of claim 1 further comprising:

accessing, from electronic storage, a translation rule that is associated with a second application that has subscribed to the selected channel defined in the integration hub to which the common format data object was published, the translation rule that is associated with the second application defining at least one rule for translating data objects from the common format used by the integration hub to a second proprietary format used by the second application;

translating the common format data object that represents the event into a second data object that is structured in the second proprietary format used by the second application based on the accessed translation rule that is associated with the second application; and sending the second data object in the second proprietary format to the second application.

3. The method of claim 2 wherein:

accessing, from electronic storage, the translation rule that is associated with the first application comprises accessing a first translation rule;

accessing, from electronic storage, the translation rule that is associated with the second application comprises:

accessing, from electronic storage, a second translation rule that is associated with the second application that has subscribed to the selected channel defined in the integration hub to which the common format data object was published, the second translation rule defining at least one rule for translating data objects from the common format used by the integration hub to a second proprietary format used by the second application and being different than the first translation rule, and accessing, from electronic storage, a third translation rule that is associated with a third application that has subscribed to the selected channel defined in the integration hub to which the common format data object was published, the third translation rule defining at least one rule for translating data objects from the common format used by the integration hub to a third proprietary format used by the third application and being different than the first translation rule and the second translation rule;

translating the common format data object that represents the event into the second data object that is structured in the second proprietary format used by the second application based on the accessed translation rule that is associated with the second application comprises:

translating the common format data object that represents the event into a second data object that is structured in the second proprietary format used by the second application based on the second translation rule, and translating the common format data object that represents the event into a third data object that is structured in the third proprietary format used by the third application based on the third translation rule; and sending the second data object in the second proprietary format to the second application further comprises sending the third data object in the third proprietary format to the third application.

4. The method of claim 3 further comprising:

facilitating, using the integration hub, exchange of state information between first, second, and third applications.

5. The method of claim 2 wherein:

accessing, from electronic storage, the translation rule that is associated with the first application comprises accessing a translation rule that is associated with the first application and that defines at least one rule for translating data objects corresponding to a first application program interface used by the first application into the common format;

translating the first data object that represents the event into the common format data object that represents the event based on the accessed translation rule that is associated with the first application comprises translating a first data object that corresponds to the first application program interface used by the first application into a common format data object;

accessing, from electronic storage, the translation rule that is associated with the second application comprises accessing a translation rule that is associated with the second application and that defines at least one rule for translating data objects corresponding to a second application program interface used by the second application into the common format; and translating the common format data object that represents the event into a second data object that is structured in the second proprietary format used by the second application based on the accessed translation rule that is associated with the second application comprises translating the common format data object into a second data object that corresponds to the second application program interface used by the second application.

6. The method of claim 2 wherein:

accessing, from electronic storage, the translation rule that is associated with the first application comprises accessing a translation rule that is associated with the first application and that defines rules for changing numeric fields to alpha numeric, changing status values to enumerator or Boolean values, and copying string or numeric fields to target string or numeric fields;

translating the first data object that represents the event into the common format data object that represents the event based on the accessed translation rule that is associated with the first application comprises translating a first data object into a common format data object by changing numeric fields to alpha numeric, changing status values to enumerator or Boolean values, and copying string or numeric fields to target string or numeric fields;

accessing, from electronic storage, the translation rule that is associated with the second application comprises accessing a translation rule that is associated with the second application and that defines rules for changing numeric fields to alpha numeric, changing status values to enumerator or Boolean values, and copying string or numeric fields to target string or numeric fields; and translating the common format data object that represents the event into a second data object that is structured in the second proprietary format used by the second application based on the accessed translation rule that is associated with the second application comprises translating the common format data object into a second data object by changing numeric fields to alpha numeric, changing status values to enumerator or Boolean values, and copying string or numeric fields to target string or numeric fields.

7. The method of claim 2 wherein sending the second data object in the second proprietary format to the second application enables the second application to take action responsive to the event represented by the common format data object.

8. A system for facilitating the exchange of information among applications, the system comprising:
a plurality of digital computers, each of which executes an application, each application being configured to exchange data objects representative of events with other applications; and
an integration hub in data communication with each of the digital computers for enabling transfer of data objects representative of events between applications, the integration hub including a non-transitory computer-readable medium on which is encoded instructions for causing a computer to perform operations comprising:
receiving, from a first application, a first data object that represents an event and that is structured in a first proprietary format used by the first application;
accessing, from electronic storage, a translation rule that is associated with the first application and that defines at least one rule for translating data objects from the first proprietary format into a common format used by an integration hub;
translating the first data object that represents the event into a common format data object that represents the event based on the accessed translation rule that is associated with the first application;
identifying the event represented by the common format data object;
based on the identified event represented by the common format data object, selecting, from among multiple channels defined in the integration hub, a specific channel that is assigned to communicate, in the integration hub, common format data objects that represent the identified event;
publishing the common format data object to the selected channel that is defined in the integration hub and that is assigned to communicate, in the integration hub, common format data objects that represent the identified event;
receiving, on the selected channel, the common format data object by a second application; and
publishing an acknowledgement event to an acknowledgement channel that is defined in the integration hub and that is assigned to communicate, in the integration hub, common format data objects that represent acknowledgement events, the acknowledgement channel being different than the selected channel and the acknowledgement event indicating success or failure of communication of information included in the common format data object to the second application.

9. The system of claim 8 further comprising:
accessing, from electronic storage, a translation rule that is associated with a second application that has subscribed to the selected channel defined in the integration hub to which the common format data object was published, the translation rule that is associated with a second application defining at least one rule for translating data objects from the common format used by the integration hub to a second proprietary format used by the second application;
translating the common format data object that represents the event into a second data object that is structured in the second proprietary format used by the second application based on the accessed translation rule that is associated with the second application; and
sending the second data object in the second proprietary format to the second application.

10. The system of claim 9 wherein:
accessing, from electronic storage, the translation rule that is associated with the first application comprises accessing a first translation rule;
accessing, from electronic storage, the translation rule that is associated with the second application comprises:
accessing, from electronic storage, a second translation rule that is associated with the second application that has subscribed to the selected channel defined in the integration hub to which the common format data object was published, the second translation rule defining at least one rule for translating data objects from the common format used by the integration hub to a second proprietary format used by the second application and being different than the first translation rule, and
accessing, from electronic storage, a third translation rule that is associated with a third application that has subscribed to the selected channel defined in the integration hub to which the common format data object was published, the third translation rule defining at least one rule for translating data objects from the common format used by the integration hub to a third proprietary format used by the third application and being different than the first translation rule and the second translation rule;
translating the common format data object that represents the event into the second data object that is structured in the second proprietary format used by the second application based on the accessed translation rule that is associated with the second application comprises:
translating the common format data object that represents the event into a second data object that is structured in the second proprietary format used by the second application based on the second translation rule, and
translating the common format data object that represents the event into a third data object that is structured in the third proprietary format used by the third application based on the third translation rule; and
sending the second data object in the second proprietary format to the second application further comprises sending the third data object in the third proprietary format to the third application.

11. The system of claim 10 the operations further comprise:
facilitating, using the integration hub, exchange of state information between first, second, and third applications.

12. The system of claim 9 wherein:
accessing, from electronic storage, the translation rule that is associated with the first application comprises accessing a translation rule that is associated with the first application and that defines at least one rule for translating data objects corresponding to a first application program interface used by the first application into the common format;

translating the first data object that represents the event into the common format data object that represents the event based on the accessed translation rule that is associated with the first application comprises translating a first data object that corresponds to the first application program interface used by the first application into a common format data object;

accessing, from electronic storage, the translation rule that is associated with the second application comprises accessing a translation rule that is associated with the second application and that defines at least one rule for translating data objects corresponding to a second application program interface used by the second application into the common format; and translating the common format data object that represents the event into a second data object that is structured in the second proprietary format used by the second application based on the accessed translation rule that is associated with the second application comprises translating the common format data object into a second data object that corresponds to the second application program interface used by the second application.

13. The system of claim 9 wherein:

accessing, from electronic storage, the translation rule that is associated with the first application comprises accessing a translation rule that is associated with the first application and that defines rules for changing numeric fields to alpha numeric, changing status values to enumerator or Boolean values, and copying string or numeric fields to target string or numeric fields;

translating the first data object that represents the event into the common format data object that represents the event based on the accessed translation rule that is associated with the first application comprises translating a first data object into a common format data object by changing numeric fields to alpha numeric, changing status values to enumerator or Boolean values, and copying string or numeric fields to target string or numeric fields;

accessing, from electronic storage, the translation rule that is associated with the second application comprises accessing a translation rule that is associated with the second application and that defines rules for changing numeric fields to alpha numeric, changing status values to enumerator or Boolean values, and copying string or numeric fields to target string or numeric fields; and translating the common format data object that represents the event into a second data object that is structured in the second proprietary format used by the second application based on the accessed translation rule that is associated with the second application comprises translating the common format data object into a second data object by changing numeric fields to alpha numeric, changing status values to enumerator or Boolean values, and copying string or numeric fields to target string or numeric fields.

14. The system of claim 9 wherein sending the second data object in the second proprietary format to the second application enables the second application to take action responsive to the event represented by the common format data object.

15. A non-transitory medium having encoded thereon instructions for facilitating the exchange of information among applications, execution of the instructions causing one or more machines to perform operations comprising:

receiving, from a first application, a first data object that represents an event and that is structured in a first proprietary format used by the first application;

accessing, from electronic storage, a translation rule that is associated with the first application and that defines at least one rule for translating data objects from the first proprietary format into a common format used by an integration hub;

translating the first data object that represents the event into a common format data object that represents the event based on the accessed translation rule that is associated with the first application;

identifying the event represented by the common format data object;

based on the identified event represented by the common format data object, selecting, from among multiple channels defined in the integration hub, a specific channel that is assigned to communicate, in the integration hub, common format data objects that represent the identified event;

publishing the common format data object to the selected channel that is defined in the integration hub and that is assigned to communicate, in the integration hub, common format data objects that represent the identified event;

receiving, on the selected channel, the common format data object by a second application; and publishing an acknowledgement event to an acknowledgement channel that is defined in the integration hub and that is assigned to communicate, in the integration hub, common format data objects that represent acknowledgement events, the acknowledgement channel being different than the selected channel and the acknowledgement event indicating success or failure of communication of information included in the common format data object to the second application.

16. The medium of claim 15 further comprising:

accessing, from electronic storage, a translation rule that is associated with a second application that has subscribed to the selected channel defined in the integration hub to which the common format data object was published, the translation rule that is associated with a second application defining at least one rule for translating data objects from the common format used by the integration hub to a second proprietary format used by the second application;

translating the common format data object that represents the event into a second data object that is structured in the second proprietary format used by the second application based on the accessed translation rule that is associated with the second application; and sending the second data object in the second proprietary format to the second application.

17. The medium of claim 16 wherein:

accessing, from electronic storage, the translation rule that is associated with the first application comprises accessing a first translation rule;

accessing, from electronic storage, the translation rule that is associated with the second application comprises:

accessing, from electronic storage, a second translation rule that is associated with the second application that has subscribed to the selected channel defined in the integration hub to which the common format data object was published, the second translation rule defining at least one rule for translating data objects from the common format used by the integration hub to a second proprietary format used by the second application and being different than the first translation rule, and accessing, from electronic storage, a third translation rule that is associated with a third application that has subscribed to the selected channel defined in the integration hub to which the common format data object was published, the third translation rule defining at least one rule for translating data objects from the common format used by the integration hub to a third proprietary format used by the third application and being different than the first translation rule and the second translation rule;

translating the common format data object that represents the event into the second data object that is structured in the second proprietary format used by the second application based on the accessed translation rule that is associated with the second application comprises:

translating the common format data object that represents the event into a second data object that is structured in the second proprietary format used by the second application based on the second translation rule, and translating the common format data object that represents the event into a third data object that is structured in the third proprietary format used by the third application based on the third translation rule; and sending the second data object in the second proprietary format to the second application further comprises sending the third data object in the third proprietary format to the third application.

18. The medium of claim 17 the operations further comprise:

facilitating, using the integration hub, exchange of state information between first, second, and third applications.

19. The medium of claim 16 wherein:

accessing, from electronic storage, the translation rule that is associated with the first application comprises accessing a translation rule that is associated with the first application and that defines at least one rule for translating data objects corresponding to a first application program interface used by the first application into the common format;

translating the first data object that represents the event into the common format data object that represents the event based on the accessed translation rule that is associated with the first application comprises translating a first data object that corresponds to the first application program interface used by the first application into a common format data object;

accessing, from electronic storage, the translation rule that is associated with the second application comprises accessing a translation rule that is associated with the second application and that defines at least one rule for translating data objects corresponding to a second application program interface used by the second application into the common format; and translating the common format data object that represents the event into a second data object that is structured in the second proprietary format used by the second application based on the accessed translation rule that is associated with the second application comprises translating the common format data object into a second data object that corresponds to the second application program interface used by the second application.

20. The medium of claim 16 wherein:

accessing, from electronic storage, the translation rule that is associated with the first application comprises accessing a translation rule that is associated with the first application and that defines rules for changing numeric fields to alpha numeric, changing status values to enumerator or Boolean values, and copying string or numeric fields to target string or numeric fields;

translating the first data object that represents the event into the common format data object that represents the event based on the accessed translation rule that is associated with the first application comprises translating a first data object into a common format data object by changing numeric fields to alpha numeric, changing status values to enumerator or Boolean values, and copying string or numeric fields to target string or numeric fields;

accessing, from electronic storage, the translation rule that is associated with the second application comprises accessing a translation rule that is associated with the second application and that defines rules for changing numeric fields to alpha numeric, changing status values to enumerator or Boolean values, and copying string or numeric fields to target string or numeric fields; and translating the common format data object that represents the event into a second data object that is structured in the second proprietary format used by the second application based on the accessed translation rule that is associated with the second application comprises translating the common format data object into a second data object by changing numeric fields to alpha numeric, changing status values to enumerator or Boolean values, and copying string or numeric fields to target string or numeric fields.

21. The medium of claim 16 wherein sending the second data object in the second proprietary format to the second application enables the second application to take action responsive to the event represented by the common format data object.

* * * * *